United States Patent [19]

Williams

[11] Patent Number: 4,953,072
[45] Date of Patent: Aug. 28, 1990

[54] NODE FOR SERVICING INTERRUPT REQUEST MESSAGES ON A PENDED BUS

[75] Inventor: Douglas D. Williams, Pepperell, Mass.

[73] Assignee: Digital Equipment Corporation, Maynard, Mass.

[21] Appl. No.: 44,755

[22] Filed: May 1, 1987

[51] Int. Cl.⁵ .................. G06F 13/14; G06F 13/36; G06F 13/40; G06F 15/16
[52] U.S. Cl. .................. 364/200; 364/900; 364/242.2; 364/244.3; 364/254.5; 364/241.2; 364/242; 364/242.1; 364/230.2; 364/941; 364/940; 364/940.64; 364/940.61; 364/931.4; 364/228
[58] Field of Search ... 364/200 MS File, 900 MS File; 358/257

[56] References Cited

U.S. PATENT DOCUMENTS

| | | | |
|---|---|---|---|
| 3,881,174 | 4/1975 | Barnish | 364/200 |
| 4,028,667 | 6/1977 | Breslau et al. | 364/200 |
| 4,056,847 | 11/1977 | Marcantonio | 364/200 |
| 4,058,672 | 11/1977 | Crager et al. | 358/257 |
| 4,106,104 | 8/1978 | Nitta et al. | 364/900 |
| 4,172,284 | 10/1979 | Heinrich et al. | 364/200 |
| 4,240,140 | 12/1980 | Stafford et al. | 364/200 |
| 4,250,489 | 2/1981 | Dudash et al. | 340/825.02 |
| 4,268,904 | 5/1981 | Suzuki et al. | 364/200 |
| 4,271,464 | 6/1981 | MacMillan | 364/200 |
| 4,271,468 | 6/1981 | Christensen et al. | 364/200 |
| 4,275,440 | 6/1981 | Adams, Jr. et al. | 364/200 |
| 4,291,371 | 9/1981 | Holtey | 364/200 |
| 4,337,465 | 6/1982 | Spracklen et al. | 340/825.03 |
| 4,366,480 | 12/1982 | Van Hatten | 340/825.51 |
| 4,373,183 | 2/1983 | Means et al. | 364/200 |
| 4,443,850 | 4/1984 | Harris | 364/200 |
| 4,510,492 | 4/1985 | Mori et al. | 340/825.05 |
| 4,510,493 | 4/1985 | Bux et al. | 340/825.05 |
| 4,542,501 | 9/1985 | Chevalet et al. | 370/85 |
| 4,560,985 | 12/1985 | Strecker et al. | 340/825.5 |
| 4,583,088 | 4/1986 | Bux et al. | 340/825.5 |
| 4,598,362 | 7/1986 | Kinjo et al. | 364/200 |
| 4,615,019 | 9/1986 | Bonci | 364/900 |
| 4,642,758 | 2/1987 | Teng | 364/200 |
| 4,654,654 | 3/1987 | Butler et al. | 340/825.5 |
| 4,716,523 | 12/1987 | Burrus, Jr. et al. | 364/200 |
| 4,736,319 | 4/1988 | DasGupta et al. | 364/200 |
| 4,769,768 | 9/1988 | Bomba et al. | 364/200 |

FOREIGN PATENT DOCUMENTS 50-156336 12/1975 Japan.
53-41144 4/1978 Japan.

OTHER PUBLICATIONS

U.S. patent application Ser. No. 06/534,652 filed Sep. 22, 1933, Bomba et al.
H. Stone, "Microcomputer Interfacing," (Feb. 1983), pp. 107-110.
IBM Technical Disclosure Bulletin, "Multi-Level Interrupt Acknowledgement Circuit," vol. 28, No. 8, (Jan. 1986), pp. 3661-3663.

*Primary Examiner*—Michael R. Fleming
*Assistant Examiner*—Gopal C. Ray
*Attorney, Agent, or Firm*—Finnegan, Henderson, Farabow, Garrett and Dunner

[57] ABSTRACT

Interrupt servicing node for servicing interrupt requests on a pended bus. The interrupt servicing node provides interrupt acknowledge messages including destination data specifying a particular interrupting node at times when the interrupt servicing node is ready to service the interrupt request message. The interrupt servicing node includes storage elements for indicating whether an interrupt request is pending from a particular interrupting node. An interrupt request message on the bus includes ID data for identifying a particular interrupting node as the source of an interrupt request.

30 Claims, 10 Drawing Sheets

INTERRUPTING NODE

INTERRUPT SERVICING NODE

NODE FOR SERVICING INTERRUPT REQUEST MESSAGES ON A PENDED BUS

FIELD OF THE INVENTION

This invention relates to the servicing of interrupts over a pended bus for transferring messages between multiple nodes in a computer system.

BACKGROUND OF THE INVENTION

Modern computer systems have the capability of utilizing a number of resources that must be able to communicate with each other over a data path. A bus is provided so that a number of system resources can transfer data among themselves. Typical resources included in a computer system are processors, memory devices, and input/output (I/O) devices. I/O devices are usually the means used in computer systems to interface the elements in the system with sources and destinations outside the computer system.

An interrupt is the means by which an I/O device draws the attention of the system so that the system can attend to the needs of the I/O device. In many conventional systems, an I/O device generates a special "interrupt request" signal which is sent by way of dedicated control lines.

Alternatively, in a message-based interrupt scheme, an I/O device sends interrupt request messages to the system over the system bus. Thus, in message-based systems, no separate and distinct status and control lines are needed. The rules for creation and interpretation of messages, such as interrupt request messages, are referred to as the "protocol."

According to some protocols for servicing an interrupt request, the resource servicing the interrupt will solicit additional information from the I/O device. One way to obtain such additional information is to provide an interrupt acknowledge message. In response to the interrupt acknowledge, the I/O device returns an interrupt vector containing information particular to the requested interrupt. The interrupt vector, for example, can provide information about the starting address of a routine to service the interrupting I/O device.

In any system in which several I/O devices transmit interrupt requests, or in which one I/O device transmits several interrupt requests, some method must be provided for arbitrating among the requests. For example, either the interrupting devices or the individual interrupt requests can be assigned interrupt priorities which the system can use to aid arbitration.

The concept and some of the benefits of utilizing a "pended" bus are described below in the system overview section. Ideally, to gain the advantages of both message-based interrupt schemes and pended buses, it would be desirable to combine these two approaches. That combination, however, is difficult to achieve for several reasons. One source of difficulty is that, when using a pended bus, there is a need for additional information for routing messages between the interrupting node and the interrupt servicing node. Furthermore, the parallel activity in a pended bus, which is inherent because interrupt requests and the servicing of those requests occur simultaneously and asynchronously, makes it difficult to establish coherent or up-to-date status information on pending interrupt requests.

Adding to these problems is the complexity involved in maintaining interrupt pending status for all the interrupting nodes at all the different priority levels. This is less difficult information if dedicated control wires are used since status could be determined by examination of those wires. However, as the number of processors and other nodes on a bus increases, the number of dedicated control lines must increase, rendering the use of a dedicated control line system impractical for large multiprocessor systems.

The use of a message-based interrupt system, however, while eliminating this problem, creates other problems in maintaining pending status information. For example, in a message-based system using a pended bus, it is possible that an interrupting node may specify several interrupt servicing nodes. This introduces an additional level of difficulty in finding a solution to the problem of preventing several interrupt servicing nodes from servicing the same request. Thus, a message-based interrupt scheme on a pended bus requires some mechanism so that interrupt servicing nodes can detect actions taken by other interrupt servicing nodes.

A related problem, when messages are used to provide interrupt requests, is how an interrupt servicing node can differentiate between outstanding interrupt requests from different interrupting nodes. Otherwise, there would be contention among several interrupting nodes when an interrupt acknowledge message is sent, and the losing interrupting nodes would be forced to reissue their interrupt requests.

Accordingly, it is an object of the present invention to provide a message-based interrupt scheme on a pended bus.

It is an additional object of the invention to maintain up-to-date status information on interrupt requests and to send only a single interrupt acknowledge message in response to each request.

It is a further object of the invention to provide such a system and eliminate the need for interrupting devices to reissue interrupt requests for a single interrupting event.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the objects and in accordance with the purposes of the invention, as embodied and broadly described herein, an interrupt servicing node is adapted to be coupled to a pended bus for transferring messages between the interrupt servicing node and an interrupting node, and services an interrupt request message including ID data identifying the interrupting node. The interrupt servicing node comprises: means for detecting the interrupt request message on the bus; means for providing to the bus an interrupt acknowledge message including destination data specifying the interrupting node at times when the interrupt servicing node is ready to service the interrupt request message from the interrupting node; and storage means including a node storage element corresponding to the interrupting node, for indicating whether an interrupt request is pending from the interrupting node, the storage means including: means for setting the node storage element in response to the detecting of the interrupt request message including the ID data identifying the interrupting node;

and means for clearing the node storage element in response to the providing the bus of an interrupt acknowledge message including destination data specifying the interrupting node, thereby indicating that the interrupt request message of the interrupting node is being serviced.

The accompanying drawings, which are incorporated in and constitute a part of this specification, illustrate one embodiment of the invention, and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings.

A. System Overview

Figure 1:
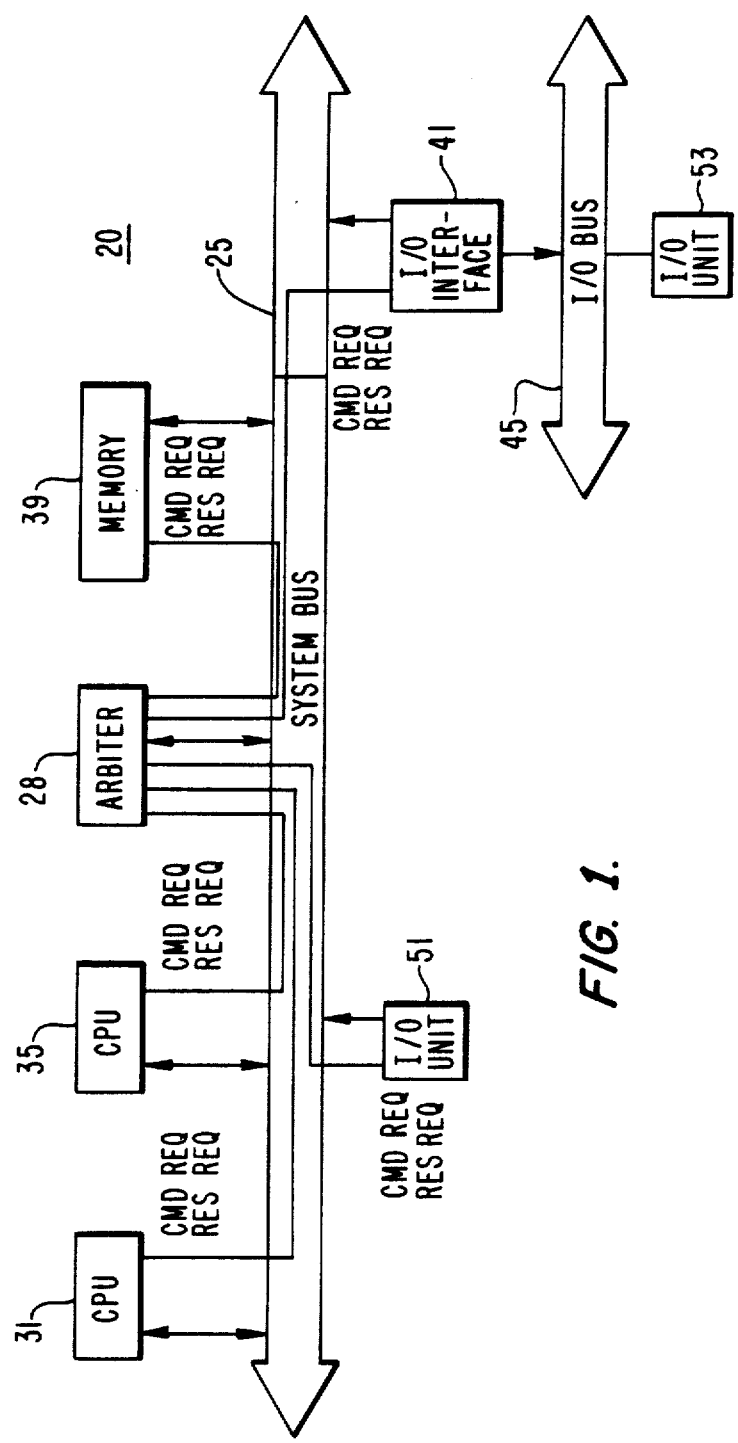
FIG. 1 is a block diagram of a data processing system including a system bus using the present invention.

FIG. 1 shows an example of a data processing system 20 which embodies the present invention. The heart of system 20 is a system bus 25 which is a synchronous bus that allows communication between several processors, memory subsystems, and I/O systems. Communications over system bus 25 occur synchronously using periodic bus cycles. A typical bus cycle time for system bus 25 is 64 nsec.

In FIG. 1, system bus 25 is coupled to two processors 31 and 35, a memory 39, one I/O interface 41 and one I/O unit 51. I/O unit 53, is coupled to system bus 25 way of I/O bus 45 and I/O unit interface 41.

A central arbiter 28 is also connected to system bus 25 in the preferred embodiment of data processing system 20. Arbiter 28 provides certain timing and bus arbitration signals directly to the other devices on system bus 25 and shares some signals with those devices.

The implementation shown in FIG. 1 is one which is presently preferred and should not necessarily be interpreted as limiting the present invention. For example, I/O unit 53 could be coupled directly to system bus 25, and arbiter 28 need not operate in the manner described for the present invention.

In the nomenclature used to describe the present invention, processors 31 and 35, memory 39, and I/O interface 41, and I/O device 51 are all called nodes. A "node" is defined as a hardware device which connects to system bus 25. A typical node 60 is shown in greater detail in FIG. 2.

According to the nomenclature used to describe the present invention, the terms "signals" or "lines" are mainly used interchangeably to refer to the names of the physical wires. The terms "data" or "levels" are mainly used to refer to the values which the signals or lines can assume.

Nodes perform transfers with other nodes over system bus 25. A "transfer" is one or more contiguous cycles that share a common transmitter and common arbitration. For example, a read operation initiated by one node to obtain information from another node on system bus 25 requires a command transfer from the first to the second node followed by one or more return data transfers from the second node to the first node at some later time.

A "transaction" is defined as the complete logical task being performed on system bus 25 and can include more than one transfer. For example, a read operation consisting of a command transfer followed later by one or more return data transfers is one transaction. In the preferred embodiment of system bus 25, the permissible transactions support the transfer of different data lengths and include read, write (masked), interlock read, unlock write, and interrupt operations. The difference between an interlock read and a regular or noninterlock read is that an interlock read to a specific location retrieves information stored at that location and restricts access to the stored information by subsequent interlock read commands. Access restriction is performed by setting a lock mechanism. A subsequent unlock write command stores information in the specified location and restores access to the stored information by resetting the lock mechanism at that location. Thus, the interlock read/unlock write operations are a form of read-modify-write operation.

Since system bus 25 is a "pended" bus, it fosters efficient use of bus resources by allowing other nodes to use bus cycles which otherwise would have been wasted waiting for responses. In a pended bus, after one node initiates a transaction, other nodes can have access to the bus before that transaction is complete. Thus, the node initiating that transaction does not tie up the bus for the entire transaction time. This contrasts with a non-pended bus in which the bus is tied up for an entire transaction. For example in system bus 25, after a node initiates a read transaction and makes a command transfer, the node to which that command transfer is directed may not be able to return the requested data immediately. Cycles on bus 25 would then be available between the command transfer and the return data transfer of the read transaction. System bus 25 allows other nodes to use those cycles.

In using system bus 25, each of the nodes can assume different roles in order to effect the transfer of information. One of those roles is a "commander" which is defined as a node which has initiated a transaction currently in progress. For example, in a write or read operation, the commander is the node that requested the write or read operation; it is not necessarily the node that sends or receives the data. In the preferred protocol for system bus 25, a node remains as the commander throughout an entire transaction even though another node may take ownership of the system bus 25 during certain cycles of the transaction. For example, although one node has control of system bus 25 during the transfer of data in response to the command transfer of a read transaction, that one node does not become the commander of the bus 25. Instead, this node is called a "responder."

A responder responds to the commander. For example, if a commander initiated a write operation to write data from node A to node B, node B would be the responder. In addition, in data processing system 20 a node can simultaneously be a commander and a responder.

Transmitters and receivers are roles which the nodes assume in an individual transfer. A "transmitter" is defined as a node which is the source of information placed on system bus 25 during a transfer. A "receiver" is the complement of the transmitter and is defined as the node which receives the information placed on system bus 25 during a transfer. During a read transaction, for example, a commander can first be a transmitter during the command transfer and then a receiver during the return data transfer.

When a node connected to system bus 25 desires to become a transmitter on system bus 25, that node asserts one of two request lines, CMD REQ (commander request) and RES REQ (responder request), which are connected between central arbiter 28 and that particular node. The CMD REQ and RES REQ lines are shown generally in FIG. 1. In general, a node uses its CMD REQ line to request to become commander and initiate transactions on system bus 25, and a node uses its RES REQ line to become a responder to return data or message to a commander. Generally, central arbiter 28 detects which nodes desire access to the bus (i.e., which request lines are asserted). The arbiter then responds to one of the asserted request lines to grant the corresponding node access to bus 25 according to a priority algorithm. In the preferred embodiment, arbiter 28 maintains two independent, circular queues: one for the commander requests and one for the responder requests. Preferably, the responder requests have a higher priority than the commander requests and are handled before the commander requests.

The commander request lines and responder request lines are considered to be arbitration signals. As illustrated in FIG. 1, and as will be explained in greater detail in the description of FIG. 6, arbitration signals also include point-to-point conditional grant signals from central arbiter 28 to each node, system bus extend signals to implement multi-bus cycle transfers, and system bus suppression signals to control the initiation of new bus transactions when, for example, a node such as memory is momentarily unable to keep up with traffic on the system bus.

Other types of signals which can constitute system bus 25 include information transfer signals, respond signals, control signals, console/front panel signals, and a few miscellaneous signals. Information transfer signals include data signals, function signals which represent the function being performed on the system bus 25 during a current cycle, identifier signals identifying the commander, and parity signals. The respond signals generally include acknowledge or confirmation signals from a receiver to notify the transmitter of the status of the data transfer.

Control signals include clock signals, warning signals, such as those identifying low line voltages or low DC voltages, reset signals used during initialization, node failure signals, default signals used during idle bus cycles, and error default signals. The console/front panel signals include signals to transmit and receive serial data to a system console, boot signals to control the behavior of a boot processor during power-up, signals to enable modification of the erasable PROM of processors 31, 35 on system bus 25, a signal to control a RUN LIGHT on the front panel, and signals providing battery power to clock logic on certain nodes. The miscellaneous signals, in addition to spare signals, include identification signals which allow each node to define its identification code.

Figure 2:
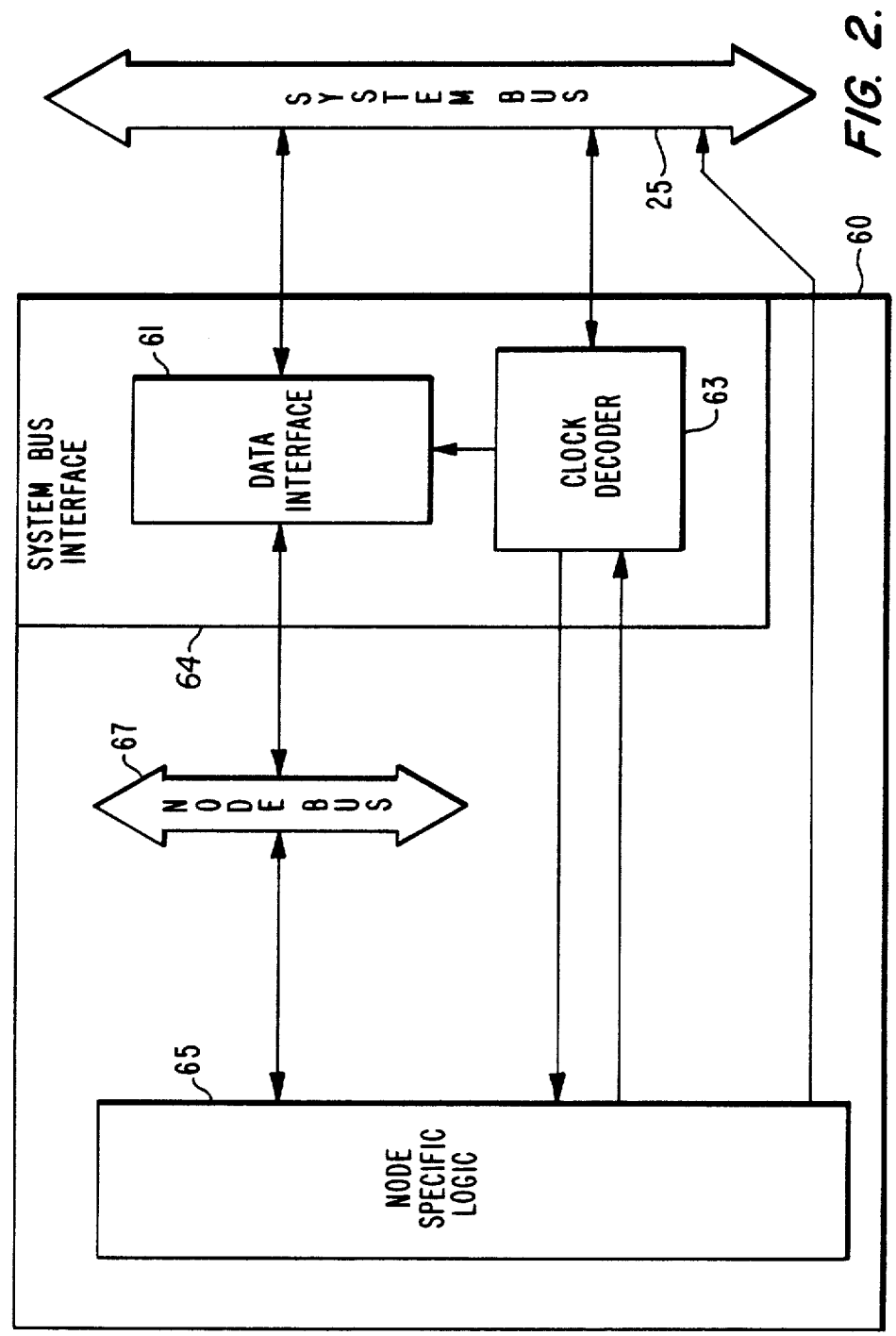
FIG. 2 is a block diagram of a node in the data processing system of FIG. 1.

FIG. 2 shows an example of a node 60 connected to system bus 25. Node 60 could be a processor, a memory, an I/O unit or an I/O interface as shown in FIG. 1. In the example shown in FIG. 2, node 60 includes node specific logic 65, a node bus 67, and a system bus interface 64 containing a data interface 61 and a clock decoder 63. Preferably, data interface 61, clock decoder 63, and node bus 67 are standard elements for nodes connected to system bus 25. The node specific logic 65, which uses different integrated circuits from system bus interface 64, preferably includes, in addition to the circuitry designed by a user to carry out the specific function of a node, standard circuitry to interface with the node bus 67. In general, data interface 61 is the primary logical and electrical interface between node 60 and system bus 25, clock decoder 63 privides timing signals to node 60 based on centrally generated clock signals, and node bus 67 provides a high speed interface between data interface 61 and node specific logic 65.

In the preferred embodiment of node 60 and system bus interface 64 shown in FIG. 2, clock decoder 63 contains control circuitry for forming signals to be placed on system bus 25 and processes clock signals received from central arbiter 28 to obtain timing signals for node specific logic 65 and data interface 61. Since the timing signals obtained by clock decoder 63 use the centrally generated clock signals, node 60 will operate synchronously with system bus 25.

Figure 3:
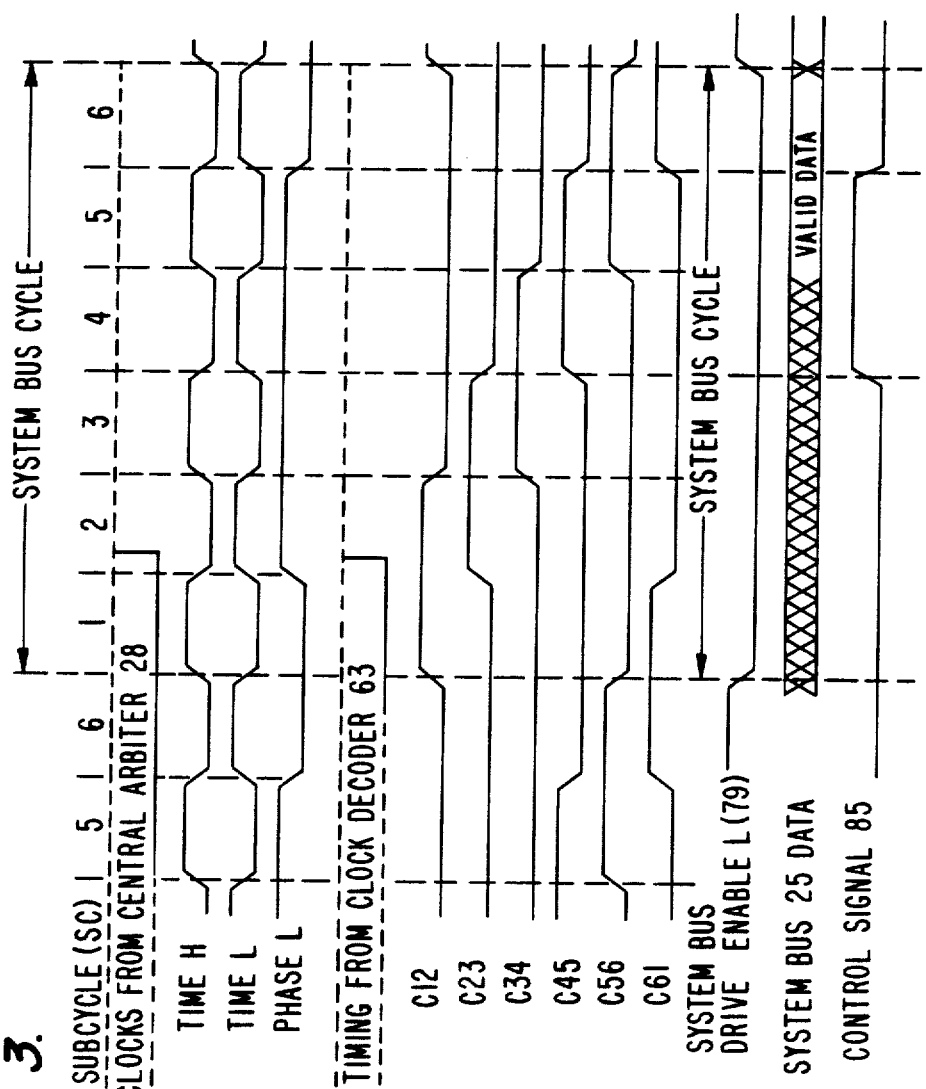
FIG. 3 is a timing diagram showing timing signals used in the data processing system of FIG. 1.

FIG. 3 is a timing diagram showing one bus cycle, the clock signals received by clock decoder 63 from central arbiter 28 (FIG. 1), and certain of the timing signals generated by clock decoder 63. The clock signals received by clock decoder 63 include a Time H signal, a Time L signal, and a Phase signal as shown in FIG. 3. Time H and Time L are inverses of the fundamental clock signals and the Phase signal is obtained by dividing the fundamental clock signal by three. The timing signals generated by clock decoder 63 include C12, C23, C34, C45, C56 and C61, all of which are shown in FIG. 3. Those timing signals required by data interface 61, which occur once per bus cycle, are provided to data interface 61, and a complete set of timing signals, including equivalent ones of the timing signals provided to data interface 61, is buffered and provided to the node specific logic 65. The purpose of buffering is to insure that node specific logic 65 cannot adversely affect the operation of the system bus interface 64 by improperly loading the timing signals. Clock decoder 63 uses the clock signals to create six subcycles for each bus cycle and then uses the subcycles to create the six timing signals CXY, where X and Y represent two adjacent subcycles which are combined to form one timing signal.

Each node in the system bus 25 has its own corresponding set of timing signals generated by its clock decoder 63. While nominally the corresponding signals occur at exactly the same time in every node throughout the system 20, variations between clock decoder 63 and other circuitry in multiple nodes introduce timing variations between corresponding signals. These timing variations are commonly known as "clock skew."

Figure 4:
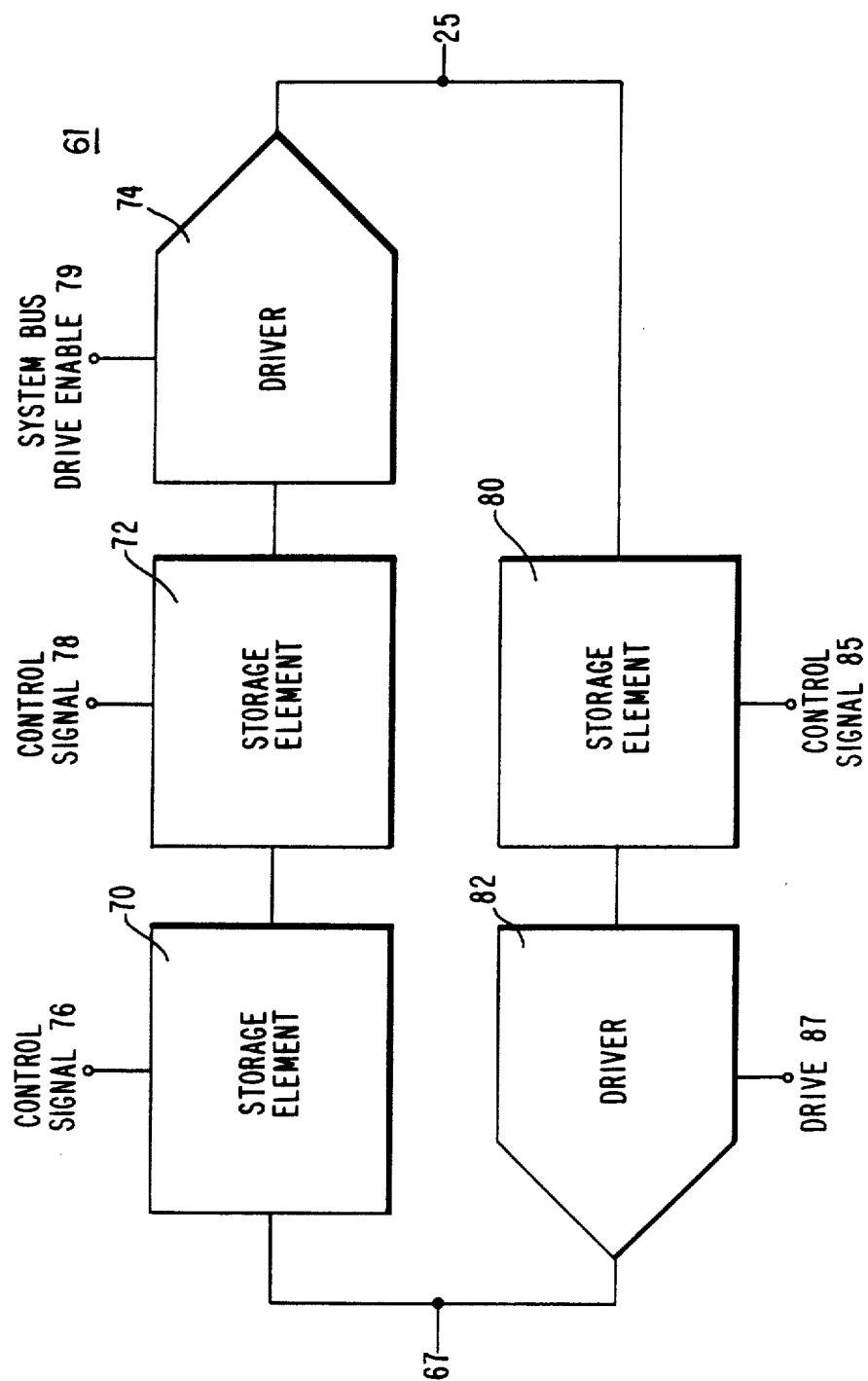
FIG. 4 is a block diagram of the data interface in the node of FIG. 2.

FIG. 4 shows a preferred embodiment of data interface 61. Data interface 61 contains both temporary storage circuitry and bus driver circuitry to provide a bidirectional and high speed interface between each of the lines of node bus 67 and each of the lines of system bus 25. As shown in FIG. 4, data interface 61 preferably includes storage elements 70 and 72 and system bus driver 74 to provide a communication path from node bus 67 to system bus 25. Data interface 61 also includes storage element 80 and node bus driver 82 to provide communication path from system bus 25 to node bus 67. As used in the description of data interface 61, the term "storage element" refers generally to bistable storage devices such as a transparent latch or a master-slave storage element, and not to a specific implementation. Persons of ordinary skill will recognize which types of storage elements are appropriate.

As shown in FIG. 4, storage element 70 has an input connected to receive data from node bus 67 and an output connected to the input of storage element 72. The output of storage element 72 is connected to an input of system bus driver 74 whose output is connected to system bus 25. Storage elements 70 and 72 are controlled by node bus control signals 76 and 78, respectively, which are derived from the timing signals generated by clock decoder 63. Storage elements 70 and 72 provide a two-stage temporary storage for pipelining data from node bus 67 to system bus 25. Different numbers of storage stages can also be used.

System bus driver 74 is controlled by system bus drive enable 79. According to the state of the system bus drive enable 79, the input of system bus driver 74 either is coupled to its output, thereby transferring the data at the output of storage element 72 to system bus 25, or decoupled from that output. When system bus drive enable 79 decouples the input and output of the system bus driver 74, system bus driver 74 presents a high impedance to system bus 25. The system bus drive enable 79 is also generated by clock decoder 63 in accordance with clock signals received from system bus 25 and control signals received from the node specific logic 65.

Storage element 80 has an input terminal connected to system bus 25 and an output terminal connected to an input of node bus driver 82. The output of node bus driver 82 is connected back to node bus 67. Storage element 80, preferably a transparent latch, is controlled by a system bus control signal 85 which is derived from the timing signals generated by clock decoder 63. A node bus drive signal 87 controls node bus driver 82 similar to the manner in which system bus drive signal 79 controls system bus driver 74. Thus, in response to node bus drive signal 87, node bus driver 82 either couples its input to its output or decouples its input from its output and provides a high impedance to node bus 67.

In order to explain how data is transferred over system bus 25, it is important to understand the relationship between system bus drive enable 79 and control signal 85. In the present embodiment, this relationship is shown in FIG. 3. System bus drive enable 79 is nominally driven from the begining to the end of a bus cycle. The new data become available for receipt from system bus 25 at some time later in the bus cycle after driver propagation and bus setting time has occurred. In the present embodiment, storage element 80 is a transparent latch. Control signal 85 is logically equivalent to clock C45. The bus timing assures that system bus 25 data is available for receipt sometime prior to the deassertion of control signal 85. Storage element 80 stores bus data that is stable at least a set-up time prior to the deassertion of control signal 85 and remains stable a hold time after the deassertion of control signal 85.

Node bus 67 is preferably a very high speed data bus which allows bidirectional data transfer between the node specific logic 65 and system bus 25 by way of data interface 61. In the preferred embodiment of node 60 shown in FIG. 2, node bus 67 is an interconnect system consisting of point-to-point connections between the system bus interface 64 and the node specific logic 65. In accordance with the present invention, however, there is no requirement for such point-to-point interconnection.

Figure 5:
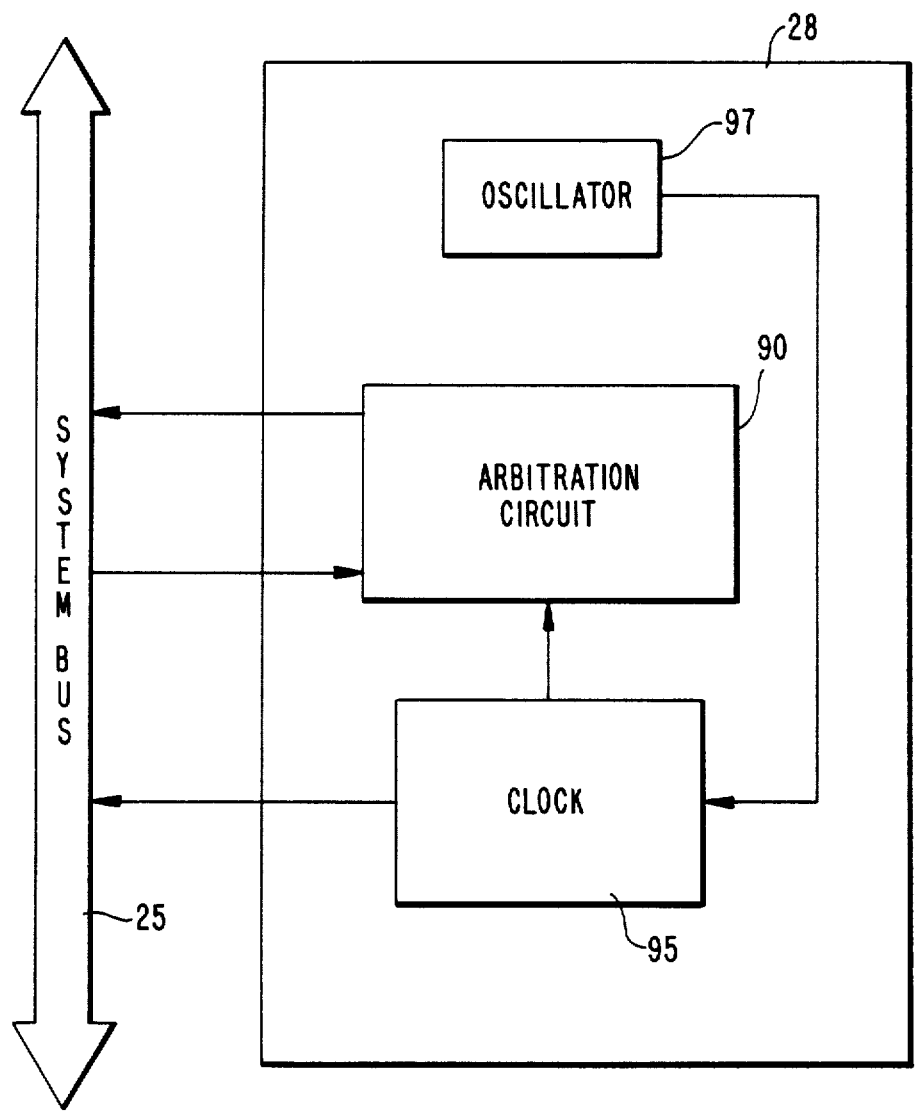
FIG. 5 is a block diagram of the arbiter in the data processing system of FIG. 1.

FIG. 5 shows a preferred embodiment of the central arbiter 28 which is also connected to system bus 25. Central arbiter 28 provides the clock signals for system bus 25 and grants ownership of the bus to the nodes on system bus 25. Central arbiter 28 preferably includes an arbitration circuit 90, a clock circuit 95, and a oscillator 97. Oscillator 97 generates the fundamental clock signals. Clock 95 provides timing signals for arbitration circuit 90 and the basic Time H, Time L, and Phase clock signals for timing on system bus 25. Arbitration circuit 90 receives the commander and responder request signals, arbitrates conflicts between nodes desiring access to system bus 25, and maintains the queues referred to above for the commander and responder requests. Arbitration circuit 90 also provides certain control signals to clock 95.

B. Interrupt Servicing

Figure 6:
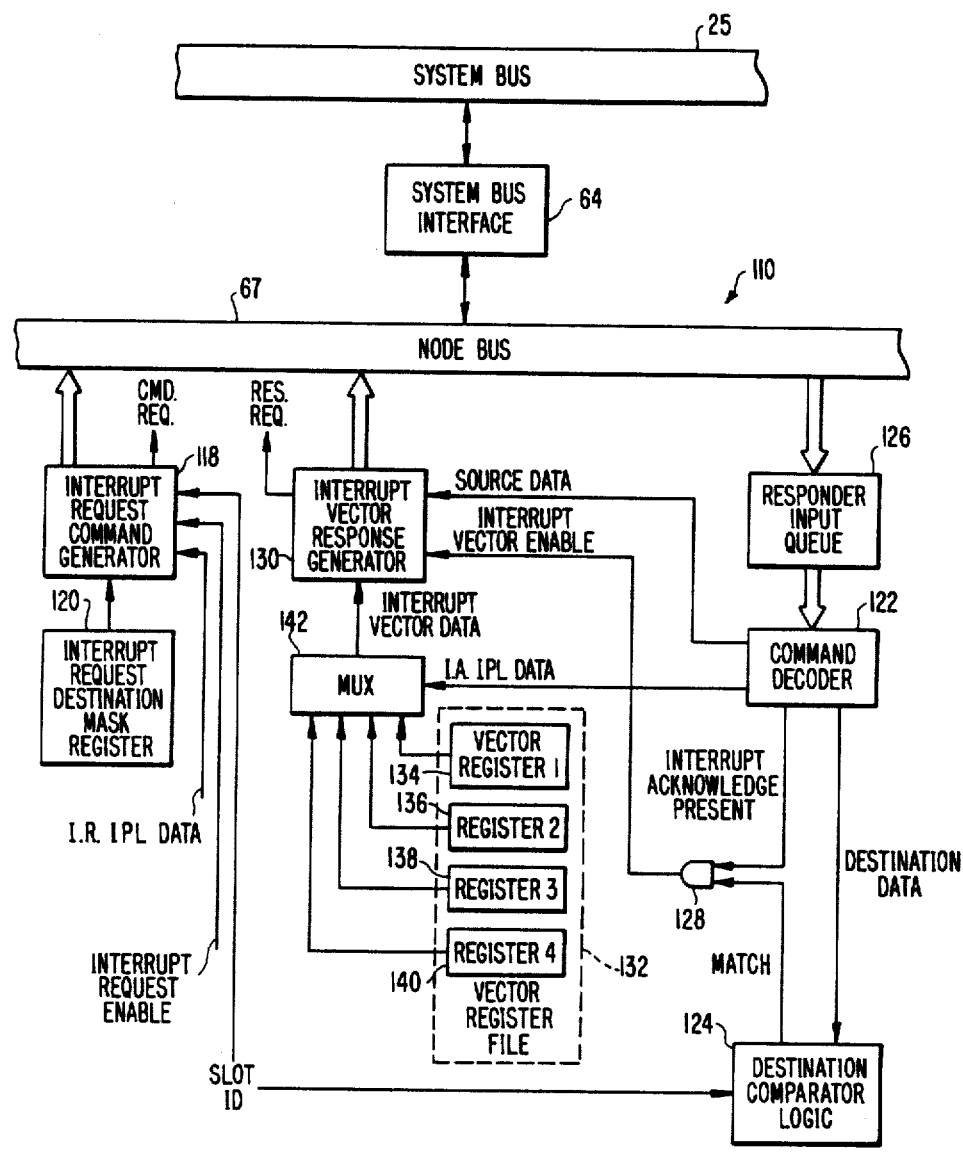
FIG. 6 is a block diagram of an interrupting node.

An interrupting node is shown in FIG. 6 and is represented generally by the numeral 110. Node 110, which has the characteristics of node 60 shown in FIG. 2, is adapted to be coupled to system bus 25, which is a pended bus. As explained above, system bus 25 transfers messages, including interrupt request, interrupt acknowledge, and interrupt vector messages, between nodes, such as a processor and an I/O device, that are adapted to be coupled to the bus. As here embodied, node 110 is adapted to be coupled to bus 25 by means of system bus interface 64 and a set of generators and decoders for creating and interpreting messages in accordance with the system protocol. Node bus 67 is provided for enabling messages to be transferred between the components in node 110 and system bus interface 64. Interrupting node 110 provides interrupt requests to system bus 25, and the requests are subsequently serviced by an interrupt servicing node.

The interrupting node includes means for providing to the bus an interrupt request message including ID data for identifying the interrupting node as the source of the interrupt request. As embodied herein, such means includes interrupt request command generator 118. Command generator 118 creates a message, in accordance with the protocol used on bus 25, which includes function and command codes that are recognizable as an interrupt request message by any other nodes using that protocol.

In the preferred embodiment, slot ID signals are input to command generator 118 in order to provide an interrupt request message with ID data identifying interrupting node 110. When a node is included in the computer system and has access to system bus 25, a physical connection is made between the node and a system backplane, which includes a number of physical slots. The connection to the backplane includes a number of wires that must be mated between the backplane and each of the nodes. Some of these wires, however, are unique to each slot on the backplane. Included in these slot unique wires are wires that are hard-coded to generate a particular ID for that slot that is distinguishable from each of the other slots. Therefore, it is preferred that the node generate the slot ID input into generator 118 using the unique set of wires from the backplane that are hard-coded with the particular ID for the slot in which the node resides. Of course, various modifications and variations can be made in the way in which ID data identifying interrupting node 110 is generated and input to command generator 118.

In the preferred embodiment, there are additional inputs to the interrupt request command generator 118. An interrupt request enable signal is input from interrupting node 110 to generator 118 in order to indicate that some event has occurred that requires node 110 to generate an interrupt that must be serviced by one of the nodes in data processing system 20.

An interrupting node can also include means for providing the interrupt request message with destination data for specifying particular interrupt servicing nodes. In node 110 shown in FIG. 6, command generator 118 receives destination data from an interrupt request destination mask register 120. The data in register 120 can be set in any of a number of ways, such as hard-coding the register, writing data into the register using a message transferred over bus 25, or internally writing data into register 120 from one of the other components in node 110.

The data stored in register 120 is a destination mask that determines which of the nodes in data processing system 20 will be specified as the destination for the interrupt request message provided to bus 25 from generator 118. If a number of nodes are included in data processing system 20 and it is desired to have several of those nodes available as resources to service the interrupt request being made by node 110, then the data in the destination mask can specify a plurality of those nodes. For example, if eight nodes in the system are processors and it is desirable to permit interrupt requests from node 110 to be serviced by four of those processors, the mask stored in register 120 can be chosen so that four specific bits will be set, each corresponding to one selected processor in data processing system 20.

The means for providing the interrupt request message can also include means for providing the interrupt request message with interrupt priority level (IPL) data for specifying a priority level of the interrupt request. For example, interrupts associated with events such as power failures will typically be at a higher priority level and will have to be serviced more quickly than interrupts associated with events such as the availability of data from a disk drive. In the preferred embodiment, interrupt priority data is input to generator 118 by node 110, and this Interrupt Request (I.R.) IPL data specifies the priority level of the interrupt request currently being generated by node 110.

The interrupting node also includes means for monitoring interrupt acknowledge messages on the bus and for detecting an interrupt acknowledge message on the bus including destination data specifying the interrupting node and corresponding to the ID data in the interrupt request message. Preferably, such means includes a command decoder 122 and destination comparator logic 124. At times when a command is transferred by a node onto system bus 25, it is received by node 110 and stored in a responder input queue 126, which typically is a first-in first-out register used as temporary storage during command decode. The messages in queue 126 are then supplied to command decoder 122. Each interrupt acknowledge command sent on system bus 25 will include function and command codes identifying that message as an interrupt acknowledge command. Command decoder 122 detects whether the message stored in queue 126 is an interrupt acknowledge message, and if so, outputs an interrupt acknowledge present signal to an AND gate 128 at times when an interrupt acknowledge message has been received.

If the message in queue 126 is an interrupt acknowledge message, it will also contain destination data. Command decoder 122 outputs this destination data to destination comparator logic 124. Destination comparator logic 124 compares the destination data with the slot ID signals, which have been previously described and which include ID data identifying interrupting node 110. At times when an interrupt acknowledge message on system bus 25 includes destination data specifying the particular interrupting node 110, destination comparator logic 124 will output to AND gate 128 a signal indicating there is a match. AND gate 128 asserts as its output an interrupt vector enable signal when command decoder 122 detects that an interrupt acknowledge message is present and destination comparator logic 124 detects that the message includes destination data specifying node 110. The interrupt vector enable signal is sent to an interrupt vector response generator 130.

In an interrupting node, there is means for providing to the bus, in response to the detection of an interrupt acknowledge message including the destination data specifying the interrupting node, an interrupt vector message. As embodied herein, such means includes interrupt vector response generator 130. Response generator 130 is similar to command generator 118 in that both generators transform input data into a message in the format required by the system protocol. Response generator 130 is enabled by the interrupt vector enable signal level from AND gate 128. The information transmitted by interrupting node 110 to system bus 25 in response to an interrupt acknowledge message is stored in a vector register file 132. As shown in FIG. 6, vector register file 132 includes vector registers 134, 136, 138, and 140.

In the preferred embodiment shown in FIG. 6, several vector registers may be used because node 110 may be capable of generating interrupt request messages in response to separate events that require service by execution of a different set of program instructions. Therefore, an interrupting node can include means for selecting one of a plurality of interrupt vector messages according to priority level data from the interrupt acknowledge message. As embodied herein, this means can comprise a vector register file 132 and a multiplexer 142 to select the interrupt vector data contained in one of the vector registers in vector register file 132.

An interrupt acknowledge message on bus 25 will preferably be provided with interrupt acknowledge interrupt priority level (I.A. IPL) data specifying the priority level of the interrupt request message that an interrupt servicing node is ready to service. The I.A. IPL data is supplied by command decoder 122 to multiplexer 142 which selects the interrupt vector data in accordance with the received I.A. IPL data. As a result, the selected interrupt vector data will be supplied to interrupt vector response generator 130 and will be included in the interrupt vector message provided by generator 130. Response generator 130 then outputs the interrupt vector message to system bus 25 so that the message can be received by the interrupt servicing node.

The interrupting node can also include means for providing the interrupt vector message with source data identifying a particular interrupt servicing node. In the preferred embodiment, the interrupt acknowledge message provided by an interrupt servicing node and detected by node 110 includes source data for identifying a particular interrupt servicing node as the source of the interrupt acknowledge message. This source data is supplied from command decoder 122 to interrupt vector response generator 130. When generator 130 creates an interrupt vector message, it utilizes the source data received from command decoder 122 in order to provide to the bus an interrupt vector message with source data. The inclusion of source data in the interrupt vector message facilitates the reception of the interrupt vector data requested by a particular interrupt servicing node.

Figure 7:
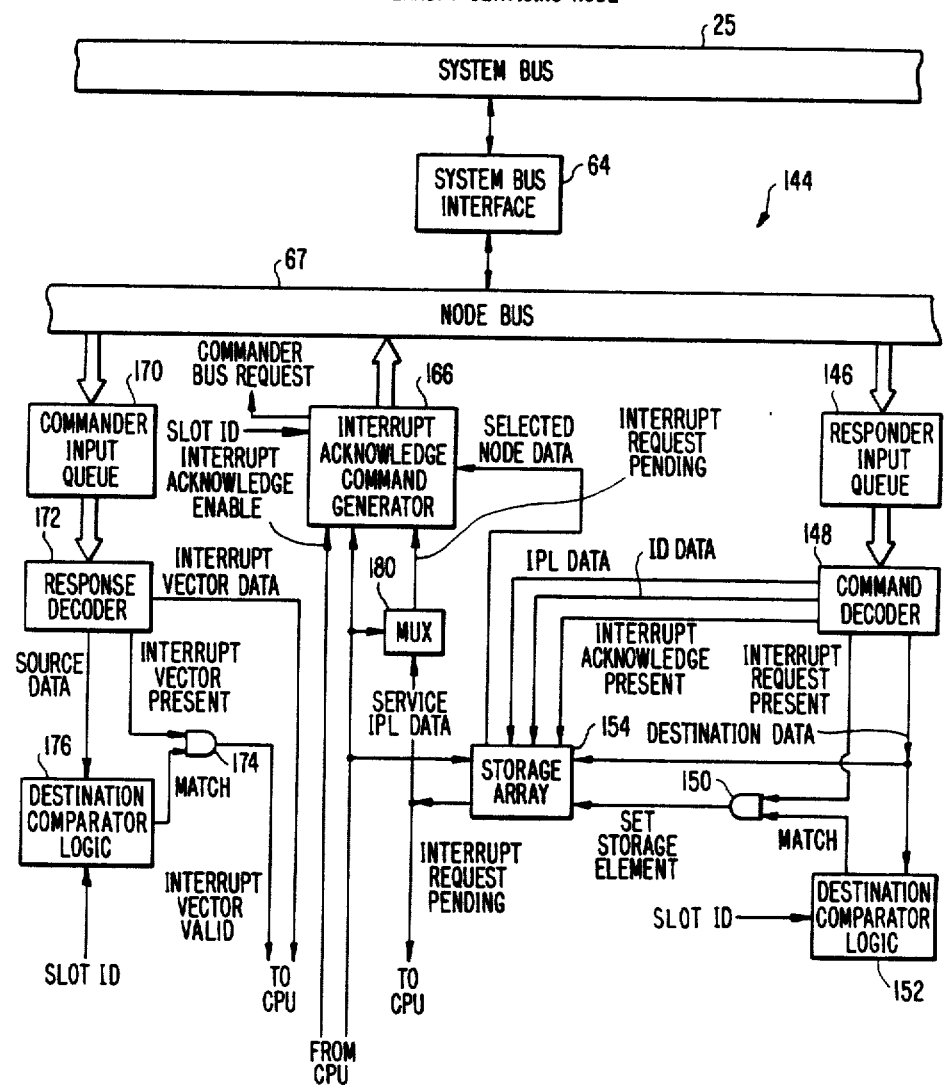
FIG. 7 is a block diagram of an interrupt servicing node.
Figure 8:
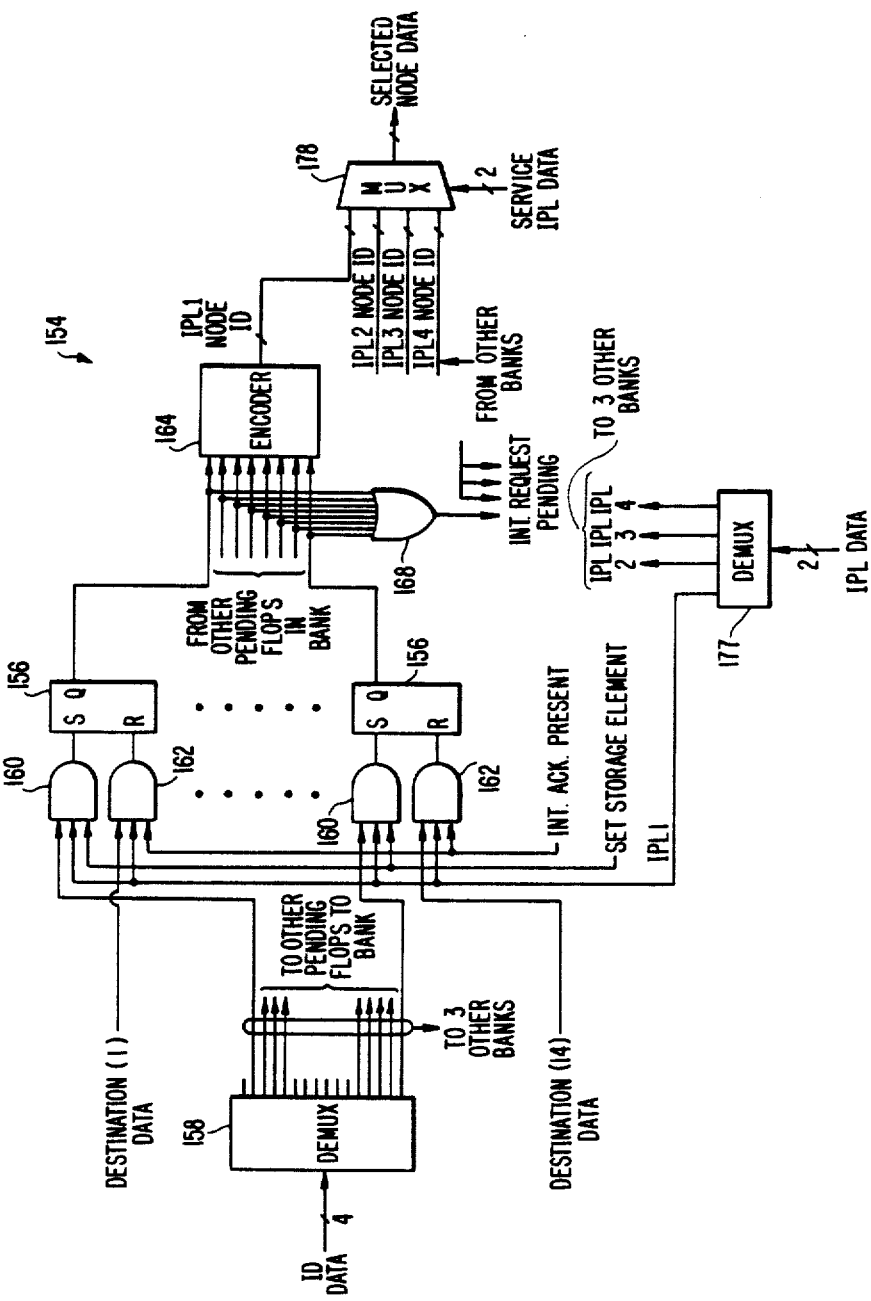
FIG. 8 is a block diagram of storage elements included in the interrupt servicing node.

An interrupt servicing node which embodies the principles of the present invention is shown in FIGS. 7 and 8 and is represented generally by the numeral 144. The slot ID signals, system bus interface 64, node bus 67, input queues, command generator, decoders, and destination comparator logic shown in FIG. 7 are similar in structure and operation to corresponding elements shown in FIG. 6 for node 110 and described in the discussion of interrupting node 110. Using these elements, in conjunction with the elements shown in FIG. 6, it is possible for a node to function both as an interrupting node and an interrupt servicing node. Interrupt servicing node 144 services interrupt request messages on bus 25 which were provided by an interrupting node. Node 144 is adapted to be coupled to system bus 25 through system bus interface 64 and a set of generators and decoders.

The interrupt servicing node of this invention includes means for detecting interrupt request messages on the bus including ID data identifying the interrupting node. Preferably, messages transferred on pended bus 25 are stored by interrupt servicing node 144 in a responder input queue 146, which is a first-in first-out register used as temporary storage during command decode. Each stored message is then supplied to a command decoder 148, which is included in the detection means. An interrupt request message transferred on system bus 25 includes function and command codes identifying it as an interrupt request message, and decoder 148 will supply an interrupt request present signal to an AND gate 150 in response to the detection of an interrupt request message on bus 25.

Destination comparator logic 152 in interrupt servicing node 144 is used to examine destination data in interrupt request messages. As described previously, the interrupt request message provided by interrupting node 110 can include destination data for specifying particular interrupt servicing nodes. This destination data, in the form of a destination mask, is output by decoder 148 to destination comparator logic 152. Comparator logic 152 compares the destination data with slot ID signals that uniquely identify interrupt servicing node 144. If interrupt servicing node 144 is one of the nodes specified or selected in the destination mask, comparator logic 152 will assert to AND gate 150 a signal indicating that there is a match. In the preferred embodiment, AND gate 150 will assert a set storage element signal, indicating that an interrupt request message has been detected which includes destination data specifying interrupt servicing node 144.

In accordance with the invention, an interrupt servicing node also includes means for indicating that an interrupt request is pending from an interrupting node. As embodied in interrupt servicing node 144, such indicating means are provided by a storage array 154. The particular interrupting node making an interrupt request is determined by node 144 utilizing the interrupting node ID data included in the interrupt request message provided to the bus by interrupting node 110. This information is then stored using storage array 154 to indicate that an interrupt request is pending from the corresponding interrupting node.

In accordance with the present invention, the interrupt servicing node has storage means including node storage elements, each corresponding to a different one of the interrupting nodes, for indicating whether an interrupt request is pending from the corresponding node. As embodied in node 144, such storage means may comprise storage array 154.

The interrupt servicing node of the present invention also includes means for setting one of the node storage elements in response to the detecting of the interrupt request message including the ID data which identifies a corresponding interrupting node as the source of the interrupt request. This indicates that the corresponding interrupting node has a pending interrupt request.

The preferred embodiment of storage array 154 is shown in FIG. 8. Storage elements are included in array 154 and correspond to particular interrupting nodes. Preferably, set-reset flip-flops are utilized as the storage elements, with each storage element 156 corresponding to a particular interrupting node. As shown in FIGS. 7 and 8, interrupting node ID data is output from command decoder 148 to a demultiplexer 158. The interrupting node ID data is included in the interrupt request message provided by an interrupting node to system bus 25. Demultiplexer 158, in response to the ID data, activates a single node select line and asserts a signal enabling one of a number of AND gates 160, each of which is coupled to the set terminal of the storage element 156 corresponding to a particular interrupting node. The set storage element signal from AND gate 150 is also received by each of the AND gates 160. AND gate 160 thus acts as a setting means. As a result, a single storage element 156 corresponding to the particular interrupting node will be set to indicate that there is a pending interrupt request from that node.

The present invention also includes means for clearing the node storage element corresponding to a particular interrupting node in response to the providing to the bus of an interrupt acknowledge message including the destination data specifying the interrupting node. As embodied herein, interrupt acknowledge messages provided on system bus 25 include destination data specifying node 110 as having an interrupt request that an interrupt servicing node is ready to service. This destination data is output by command decoder 148 to storage array 154, and is shown in FIG. 8 by a set of destination data lines, each line providing an enable input to one of a number of AND gates 162. As a result, in response to an interrupt acknowledge message on system bus 25, a selected AND gate 162 will be enabled. The particular AND gate 162 selected will depend upon the destination data included in the interrupt acknowledge message. The output of the selected AND gate 162 will be coupled with the reset input of storage element 156 corresponding to the particular interrupting node specified as the destination of the interrupt acknowledge message. In response to an interrupt acknowledge message, command decoder 148 will output an interrupt acknowledge present signal to each of the AND gates 162, so that clearing of a storage element occurs. AND gates 162 thus act as a clearing means. As a result, a single storage element 156 corresponding to node 110 is cleared whenever an interrupt acknowledge message indicates that the interrupt request from that particular node is being serviced.

Interrupt servicing nodes may include means for specifying the identity of the interrupting node corresponding to each storage element. As embodied herein, such specifying means includes an encoder 164. The outputs from each of the storage elements 156 are coupled to encoder 164. Encoder 164 scans each of the inputs in some predetermined order and selects a particular one of the storages elements 156 that are set. Encoder 164 outputs selected node data that identifies the particular interrupting node that will be serviced by node 144. As shown in FIG. 7, this selected node data is output from the storage array 154 to an interrupt acknowledge command generator 166, and specifies the identity of the particular interrupting node being serviced by the interrupt servicing node.

In accordance with the present invention, the interrupt servicing node includes means for providing to the bus an interrupt acknowledge message including destination data specifying a particular interrupting node at times when the interrupt servicing node is ready to service an interrupt request message from that node. As embodied herein, the means for providing the interrupt acknowledge message includes an interrupt acknowledge command generator 166. Preferably, an interrupt request message received from system bus 25 includes ID data identifying the particular interrupting node 110. As described previously, this ID data is output from decoder 148 to demultiplexer 158 and is used to set a storage element corresponding to the particular interrupting node 110 in storage array 154. The outputs from each of the storage elements 156 are coupled to one of the OR gates 168. Each OR gate 168 has an interrupt request pending output provided to other logic elements in the interrupt servicing node. The interrupt request pending output indicates that a pending interrupt request is present. When node 144 is ready to service an interrupt request, logic in node 144, such as a CPU, asserts an interrupt acknowledge enable signal to interrupt acknowledge command generator 166. Generator 166 can create an interrupt acknowledge message including destination data specifying a particular interrupting node having a pending interrupt request because encoder 164 outputs selected node data to generator 166. The selected node data specifies the identity of the particular interrupting node 110 that will be the destination of the interrupt acknowledge message being generated. The generator 166 then provides the interrupt acknowledge message to system bus 25.

In accordance with the invention, an interrupt servicing node can also include means for detecting an interrupt vector message on the bus, which can include source data identifying the interrupt servicing node. As embodied herein and shown in FIG. 7, node 144 includes a commander input queue 170, which is a first-in first-out register, for storing messages transferred on system bus 25. The stored messages are transferred to response decoder 172, which provides the detection means. At times when the decoder 172 detects the presence of an interrupt vector message, it enables AND gate 174. In the preferred embodiment of the invention, interrupt vector messages on system bus 25 will include source data specifying a particular interrupt servicing node 144. This source data is output by decoder 172 to destination comparator logic 176, which compares it with slot ID signals that uniquely identify interrupt servicing node 144. If node 144 is the intended destination of the interupt vector data contained in the interrupt vector message, the inputs to comparator logic 176 will match, and comparator logic 176 will enable AND gate 174. When both of the above inputs to AND gate 174 are enabled, AND gate 174 will assert an interrupt vector valid signal to logic in node 144. Response decoder 172 will also output the interrupt vector data contained in the interrupt vector message to logic in node 144. This information will allow interrupt servicing node 144 to compute the starting address of the program corresponding to the interrupt request generated by interrupting node 110. Preferably, interrupt servicing node 144 will include a CPU that enters a wait state after node 144 provides an interrupt acknowledge message to system bus 25, and awaits the receipt of an interrupt vector message from system bus 25.

In accordance with one aspect of the invention, an interrupt servicing node includes means for obtaining control of the bus at times when the node is ready to service a pending interrupt request and for performing null operations for a predetermined time period before providing the interrupt acknowledge message to the pended bus. As embodied herein and shown in FIG. 7, such means includes interrupt acknowledge command generator 166. At times when interrupt acknowledge generator 166 is ready to provide an interrupt acknowledge message to system bus 25, it outputs a commander request signal to demand access to system bus 25. When node 144 is granted access to bus 25, interrupt acknowledge generator 166 begins by providing bus cycles interpreted as null operations to system bus 25. These cycles provided to the bus will contain a "no-operation" function code which, according to the computer system protocol, will be interpreted by every node in the computer system as not requiring the execution of any operations. The null operations are provided by generator 166 before an actual interrupt acknowledge message is provided to system bus 25. By waiting a predetermined time period, node 144 ensures that the particular interrupting node 110 still has a pending interrupt request that has not been previously serviced by another interrupt servicing node. The predetermined time period accounts for the "pipeline" delay associated with the operation of clearing the storage element, which may require additional cycles to complete subsequent to the transmission of an interrupt acknowledge message across bus 25. By waiting this predetermined time, node 144 thus ensures that the storage elements in storage array 154 provide coherent information that accurately indicates whether a particular interrupting node 110 still has a pending interrupt request.

In the preferred embodiment of data processing system 20 shown in FIGS. 1–8, it takes the interrupt servicing nodes approximately four to eight bus cycles to clear the corresponding storage elements after an interrupt acknowledge message is provided on bus 25. Therefore, by waiting for the clearing operation to complete before providing an interrupt acknowledge message, the storage arrays will all contain up-to-date interrupt request status information. At times when node 144 has control of the system bus 25 and is performing null operations, no further interrupt acknowledge or interrupt request messages can be transmitted on system bus 25.

As embodied herein, the output of OR gate 168 is received by interrupt acknowledge command generator 166 and indicates whether any interrupt requests are still pending prior to the end of the predetermined time period. If no signal is present, this indicates that there are no pending interrupt requests, and interrupt acknowledge generator 166 may abort before providing an interrupt acknowledge message to the pended bus.

If the interrupt request from node 110 is no longer pending, but different interrupt requests are still pending in other storage elements in storage array 154, the output of OR gate 168 will indicate this pendency, and the selected node data output to interrupt acknowledge generator 166 will reflect the identity of one of the nodes having a pending interrupt request. In the preferred embodiment shown in FIGS. 7 and 8, the encoder 164 scans through a set of inputs from storage elements 156, selects one of the storage elements that is set, and presents the identity of that storage element as selected node data to generator 166.

As has been discussed previously, an interrupt servicing node of the present invention includes means for clearing the storage element corresponding to a particular interrupting node in response to the providing to the bus by any node of an interrupt acknowledge message including destination data specifying the particular interrupting node. Therefore, whenever an interrupt request from a particular interrupting node 110 is being serviced by any of the interrupt servicing nodes in data processing system 20, the storage element 156 corresponding to the particular interrupting node 110 will be cleared to indicate that the interrupt request of node 110 is being serviced. This prevents interrupt servicing node 144 from providing an additional interrupt acknowledge message and attempting to service a particular node 110 that no longer has a pending interrupt request.

In accordance with the present invention, an interrupt servicing node can also include means for providing the interrupt acknowledge message with source data for identifying the interrupt servicing node. Provision of this source data facilitates the targeting of an interrupt vector message to the particular interrupt servicing node 144 that previously provided an interrupt acknowledge message. As shown in FIG. 7, the interrupt acknowledge generator 166 is supplied with the slot ID signals uniquely identifying interrupt servicing node 144. As a result, generator 166 can create an interrupt acknowledge message including source data that identifies interrupt servicing node 144.

In accordance with another aspect of the invention, an interrupt servicing node can include service priority level means for specifying a service priority level for the interrupt servicing node and for indicating that the node is ready to service an interrupt request at times when the priority level of the interrupt request message is equal to the service priority level. As embodied herein, interrupt servicing node 144 can assert an interrupt acknowledge enable signal to the command generator 166 indicating that the node is ready to service a pending interrupt request. Service IPL (interrupt priority level) data specifies a selected set of pending interrupt requests that can be serviced, and together with the interrupt acknowledge enable signal provides the function of a service priority level means. In the preferred embodiment, interrupt request messages include IPL data specifying a priority level of the interrupt request, and this IPL data is output by command decoder 148 to storage array 154.

The present invention can also include means for setting a storage element corresponding to the particular interrupting node at the specified priority level of the interrupt request message, and means for indicating there is a pending interrupt request from a particular interrupting node at that priority level. Similarly, the invention may include means for clearing a storage element corresponding to a particular interrupting node at a specified priority level, thereby indicating that the interrupt request of an interrupting node at a specified IPL is being serviced. As embodied herein, such means include AND gates 160 and 162. In accordance with the system protocol of the preferred embodiment, interrupt acknowledge messages provided by node 144 also include data specifying the priority level of the interrupt request message that the interrupt servicing node is ready to service.

In the preferred embodiment, when either an interrupt request message or an interrupt acknowledge message is received by interrupt servicing node 144 from system bus 25, it contains IPL data that is output by command decoder 148 to storage array 154. Node 144 can employ several banks of storage elements, where each bank corresponds to a different IPL, and the storage elements in each bank correspond to each possible interrupting node. Demultiplexer 177 is included in storage array 154 of a node 144 and selects one of the several banks of storage elements in accordance with the priority level data of the interrupt being requested or acknowledged. There is a separate storage element 156 for each particular interrupting node at each specified priority level.

At times when an interrupt request message is provided on system bus 25, demultiplexer 177 ensures that the only AND gates 160 which will be enabled are those that are coupled to storage elements 156 corresponding to the specified priority level. Therefore, only the storage element corresponding to the particular node at the priority level specified by the IPL data in the interrupt request message will be set. Similarly, at times when an interrupt acknowledge message is provided on system bus 25, demultiplexer 177 also ensures that the only AND gates 162 that will be enabled are those that are coupled to the storage elements 156 corresponding to the IPL data contained in the interrupt acknowledge message. As a result, only the storage element corresponding to the particular interrupting node at the priority level specified by the IPL data will be cleared to indicate which interrupt request is being serviced.

Preferably, multiplexer 178 is included in node 144 as part of a means for selecting a storage element corresponding to a particular interrupting node at a specified IPL. There can be a separate OR gate 168 associated with each specified priority level, and thus, each bank, and the outputs from the OR gates 168 are sent to other logic elements in node 144 and to a multiplexer 180.

Service IPL data is sent by node 144 to multiplexer 178 so that the selected node data input to interrupt acknowledge generator 166 will correspond to a particular interrupting node having a pending interrupt request at an IPL equal to that specified by the service IPL data generated by node 144. The interrupt servicing node typically will include a CPU for servicing interrupt requests. The service IPL data determines the priority level of the interrupt requests that a CPU, for example, in interrupt servicing node 144 is ready to service. During its operations, the CPU will operate at a particular IPL which changes as the CPU executes instructions.

The CPU will periodically examine the outputs of the OR gates 168 to determine whether there are any pending interrupt requests at an IPL greater than the interrupt priority level at which the CPU is currently operating. If there is a pending interrupt request at an IPL greater than the interrupt priority level of the CPU, node 144 asserts an interrupt acknowledge enable signal and supplies service IPL data to the interrupt acknowledge command generator to indicate that node 144 is ready to service a pending interrupt request at the specified IPL. Node 144 will select a particular node ID from among the storage elements at which an interrupt request is pending corresponding to the specified service interrupt priority level (service IPL) data. Multiplexer 178 selects an output from one of the encoders 164, and outputs selected node data to generator 166. This data identifies a particular interrupting node having a pending request at the priority level specified by the service IPL data.

In the preferred embodiment of the invention, the interrupt request pending signal to be output to interrupt acknowledge command generator 166 from multiplexer 180 is selected from the outputs of OR gates 168 in accordance with the service IPL data. If after null operations have been provided for a predetermined time period, there are no pending interrupt requests at the priority level specified by the service IPL data, the interrupt acknowledge generator 166 will abort and will not provide an interrupt acknowledge message.

In the preferred embodiment, the interrupt acknowledge message created by interrupt acknowledge generator 166 also includes IPL data specifying the interrupt priority level of the interrupt request message being serviced by node 144. Generator 166 receives the service IPL data as an input and includes this IPL data in the interrupt acknowledge message provided to the bus.

Figure 9A:
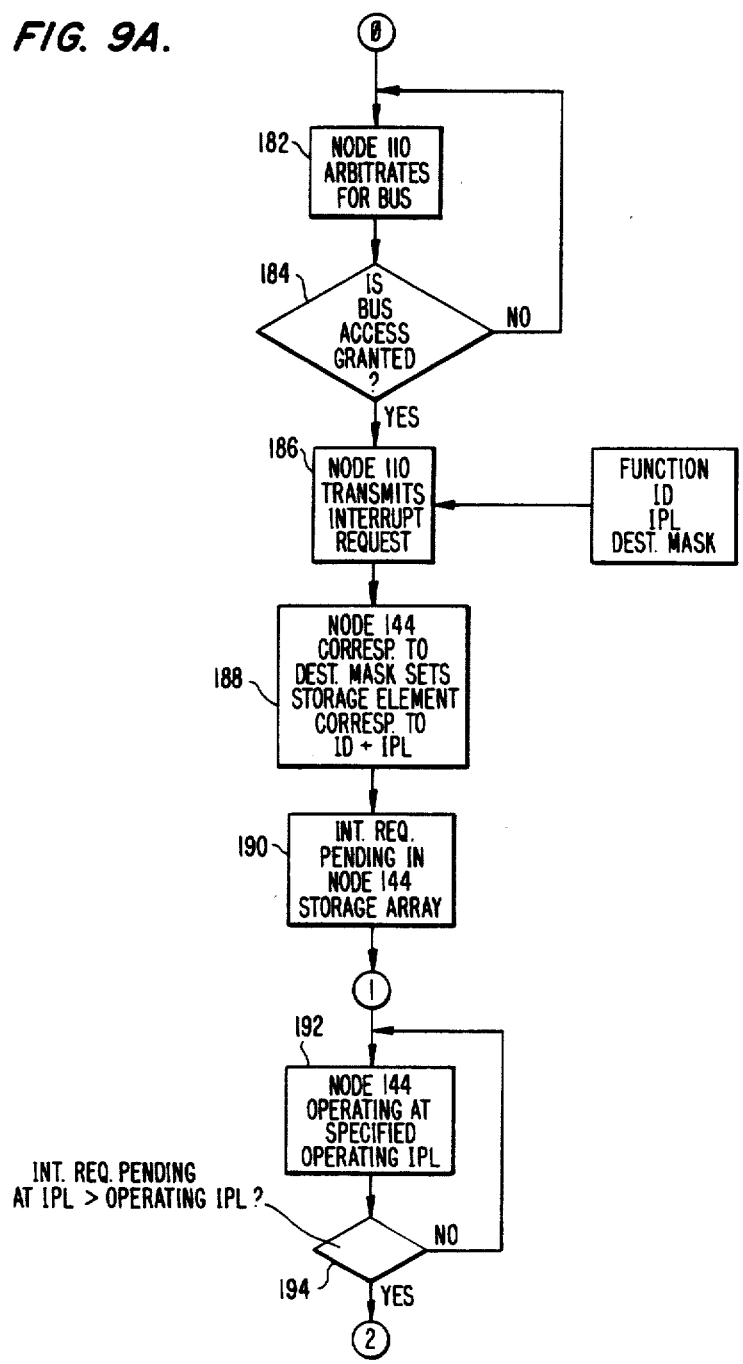
FIGS. 9A and 9B are a flowchart of a method for servicing interrupt requests.
Figure 9B:
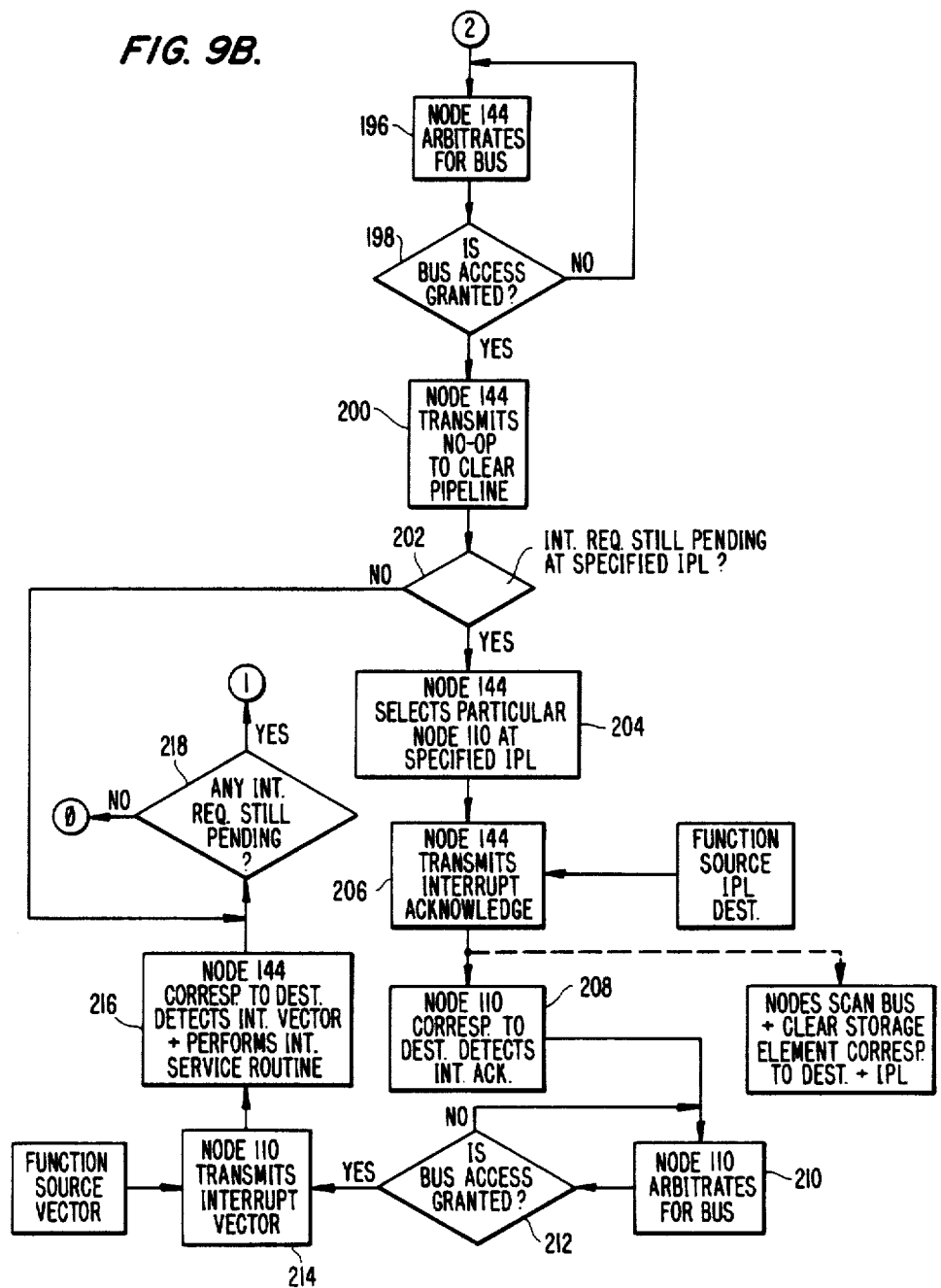

To understand the operation of the entire interrupt servicing system and method, a flowchart is provided in FIGS. 9A-B. In the method demonstrated by the flowchart, the system bus receives from an interrupting node an interrupt request message including ID data for identifying that node. The interrupt servicing node provides to the system bus an interrupt acknowledge message including destination data specifying the particular interrupting node at times when the interrupt servicing node is ready to service the interrupt request message. The interrupting node detects whether an interrupt acknowledge message on the bus includes destination data specifying itself. In response to the detection of an interrupt acknowledge message including destination data specifying that node, the interrupting node provides an interrupt vector message to the bus. Preferably, the interrupt servicing node also provides IPL data specifying the priority level of the interrupt request message, so that the interrupting node can select one of a plurality of interrupt vector messages in accordance with the IPL data.

In step 182 of the flowchart in FIGS. 9A and 9B, interrupting node 110 arbitrates for access to the bus. In order to contend for the bus, a node must output a bus request signal. In step 184, node 110 determines whether access has been granted. If not, node 110 returns to step 182. If bus access has been granted, in step 186 the interrupting node transmits an interrupt request message on the system bus. The interrupt request message includes function and command codes identifying the message as an interrupt request command, IPL data specifying a priority level for the interrupt request, a destination mask for specifying the interrupt servicing nodes that can service the request, and ID data for specifying node 110 as the source of the interrupt request. In step 188, the interrupt servicing node 144 designated by the destination data will set a storage element corresponding to the ID data and IPL data of the interrupt request message. The setting of the storage element indicates that there is a pending interrupt request that can be serviced by node 144. In step 190, signal levels from storage array 154 in node 144 indicate to the logic of node 144 that there is pending interrupt request. In step 192, the interrupt servicing node 144 is operating at a particular interrupt priority level (IPL). In step 194, a determination is made whether there is a pending interrupt request having an IPL greater than the current operating IPL of node 144. If not, node 144 continues with step 192.

If the IPL of a pending interrupt request is greater than the operating IPL of node 144, node 144 will arbitrate for access to the system bus. As shown in FIG. 7, generator 166 outputs a commander request signal to demand access. If bus access is not granted in step 198, node 144 continues with step 196. When bus access is granted in the preferred embodiment, node 144 in step 200 will issue a series of null cycles after obtaining access to the bus in order to allow its storage array 154 to be updated to reflect previous interrupt acknowledge messages.

In step 202, node 144 determines whether storage array 154 indicates that there is still a pending interrupt request at the specified IPL. If not, the interrupt servicing node 144 goes to step 218 for a determination of the presence of any pending interrupt requests at other levels. If a pending interrupt request still exists, in step 204 the interrupt servicing node selects one of the storage elements that is set to indicate an interrupt request is pending that corresponds to a particular interrupting node at the specified IPL.

In step 206, node 144 provides an interrupt acknowledge message to the bus. The interrupt acknowledge message includes function and command codes identifying the message as an acknowledge command, IPL data, source data identifying node 144 as the source of the interrupt acknowledge message, and destination data specifying node 110. This will cause interrupt servicing nodes in the system to eventually clear the storage element corresponding to the interrupt request message being serviced.

In step 208, the interrupt acknowledge message is detected by the interrupting node 110 designated by the destination data in the interrupt acknowledge message. In step 210, interrupting node 110 arbitrates for the bus. If access to the bus is not granted in step 212, node 110 continues with step 210. If node 110 obtains control of the bus, the interrupting node provides an interrupt vector message to the bus in step 214 corresponding to priority data contained in the interrupt acknowledge message. The interrupt vector message includes the source data identifying the interrupt servicing node 144, a function code indicating that the message is an interrupt vector message, and the interrupt vector data needed by node 144 in order to compute the starting address of the program to service the pending interrupt request.

In step 216, the interrupt servicing node 144 designated by the source data is in a wait state and detects the interrupt vector message. It uses this interrupt vector information in order to perform an interrupt service routine. Finally, in step 218, node 144 determines whether any pending interrupt requests are indicated by storage array 154. If not, the method returns to step 182. If there are other pending interrupt requests, the method continues at step 192.

In the foregoing description, the interrupting nodes can include input/output devices, such as disk drives and disk drive controllers, and can include nodes which are used to couple a number or a variety of I/O devices to a system bus 25. Similarly, the interrupt servicing nodes can include a processing means for servicing interrupt requests. Typically, the interrupt servicing nodes will contain a CPU in order to service interrupt requests. Additionally, it is possible for a single node to generate and service interrupt requests.

It will be apparent to those skilled in the art that various modifications and variations can be made in the present invention without departing from the scope or spirit of the invention. Thus, it is intended that the present invention cover the modifications and variations of this invention provided they come within the scope of the appended claims and their equivalents.

What is claimed is:

1. An interrupt servicing node for servicing an interrupt request message from an interrupting node including ID data identifying the interrupting node, the interrupt servicing node adapted to be coupled to a pended bus for transferring messages between the interrupt servicing node and the interrupting node, the interrupt servicing node comprising:
   means for detecting the interrupt request message on the bus;
   means for providing to the bus an interrupt acknowledge message including destination data specifying the interrupting node at times when the interrupt servicing node is ready to service the interrupt request message from the interrupting node;
   means for obtaining control of the bus at times when the interrupt servicing node is ready to service the interrupt request message and for performing null operations for a predetermined time period before providing the interrupt acknowledge message; and
   storage means, coupled to the detecting means and the providing means, including a plurality of node storage elements each corresponding to an interrupting node, for indicating whether an interrupt request is pending from the interrupting node, the storage means including:
      means, coupled to the detecting means, for setting the node storage element corresponding to the interrupting node in response to the detecting of the interrupt request message including the ID data identifying the interrupting node; and
      means, coupled to the providing means, for clearing the node storage element corresponding to the interrupting node in response to the providing of an interrupt acknowledge message including destination data specifying the interrupting node.

2. An interrupt servicing node for servicing an interrupt request message from an interrupting node including ID data identifying the interrupting node, the interrupt servicing node adapted to be coupled to a pended bus for transferring messages between the interrupt servicing node and the interrupting node, the interrupt servicing node comrising:
   means for detecting the interrupt request message on the bus;
   means for providing to the bus an interrupt acknowledge message including destination data specifying the interrupting node at times when the interrupt servicing node is ready to service the interrupt request message from the interrupting node, in which the providing means includes means for providing the interrupt acknowledge message with source data identifying the interrupt servicing node as the source of the interrupt acknowledge message; and
   storage means, coupled to the detecting means and the providing means, including a plurality of node storage elements each corresponding to an interrupting node, for indicating whether an interrupt request is pending from the interrupting node, the storage means including:
      means, coupled to the detecting means, for setting the node storage element corresponding to the interrupting node in response to the detecting of the interrupt request message including the ID data identifying the interrupting node; and
      means, coupled to the providing means, for clearing the node storage element corresponding to the interrupting node in response to the providing of an interrupt acknowledge message including destination data specifying the interrupting node.

3. An interrupt servicing node in accordance with claim 1 in which the providing means includes means for providing the interrupt acknowledge message with source data identifying the interrupt servicing node as the source of the interrupt acknowledge message.

4. An interrupt servicing node for servicing an interrupt request message from an interrupting node including ID data identifying the interrupting node and priority level data specifying a priority level of the interrupt request message, the interrupt servicing node adapted to be coupled to a pended bus for transferring messages between the interrupt servicing node and the interrupting node, the interrupt servicing node comprising:
   means for detecting the interrupt request message on the bus;
   means for providing to the bus an interrupt acknowledge message including destination data specifying the interrupting node and priority level data specifying the priority level at times when the interrupt servicing node is ready to service the interrupt request message from the interrupting node; and
   storage means, coupled to the detecting means and the providing means, including a plurality of node storage elements each corresponding to an interrupting node at a specified priority level, for indicating whether an interrupt request is pending from the interrupting node at the specified priority level, the storage means including:
      means, coupled to the detecting means, for setting the node storage element corresponding to the interrupting node at the specified priority level in response to the detecting of the interrupt request message including the ID and priority level data which identifies the interrupting node and specifies the priority level of the interrupt request message;

means, coupled to the providing means, for clearing the node storage element corresponding to the interrupting node at the specified priority level in response to the providing of an interrupt acknowledge message including destination data specifying the interrupting node and priority level data specifying the priority level of the interrupt request message; and service priority level means, coupled to the providing means, for specifying a service priority level for the interrupt servicing node and for indicating that the interrupt servicing node is ready to service the interrupt request message at times when the priority level of the interrupt request message is greater than the service priority level.

5. An interrupt servicing node in accordance with claim 4 in which the interrupt servicing node is an processor.

6. An interrupt servicing node in accordance with claim 4 including means for obtaining control of the bus at times when the interrupt servicing node is ready to service the interrupt request message and for performing null operations for a predetermined time period before providing the interrupt acknowledge message.

7. An interrupt servicing node in accordance with claim 4 in which the providing means includes means for providing the interrupt acknowledge message with source data identifying the interrupt servicing node as the source of the interrupt acknowledge message.

8. An interrupt servicing node in accordance with claim 6 in which the providing means includes means for providing the interrupt acknowledge message with source data identifying the interrupt servicing node as the source of the interrupt acknowledge message.

9. An interrupt servicing node for servicing an interrupt request message from an interrupting node including ID data identifying the interrupting node, the interrupt servicing node adapted to be coupled to a pended bus for transferring messages between the interrupt servicing node and the interrupting node, the interrupt servicing node comprising:

means for detecting the interrupt request message on the bus;

means for detecting an interrupt acknowledge message on the bus including destination data specifying the interrupting node;

means for providing to the bus an interrupt acknowledge message including destination data specifying the interrupting node at times when the interrupt servicing node is ready to service the interrupt request message from the interrupting node; and storage means, coupled to the detecting means and the providing means, including a plurality of node storage elements each corresponding to an interrupting node, for indicating whether an interrupt request is pending from the interrupting node, the storage means including:

means, coupled to the detecting means, for setting the node storage element corresponding to the interrupting node in response to the detecting of the interrupt request message including the ID data identifying the interrupting node; and means, coupled to the providing means, for clearing the node storage element corresponding to the interrupting node in response to the providing of an interrupt acknowledge message including destination data specifying the interrupting node.

10. An interrupt servicing node in accordance with claim 4 further comprising means for detecting an interrupt acknowledge message on the bus including destination data specifying the interrupting node and priority level data specifying the priority level.

11. An interrupt servicing node in accordance with claim 2 further including means for detecting an interrupt vector message on the bus including source data identifying the interrupt servicing node.

12. An interrupt servicing node in accordance with claim 3 further including means for detecting an interrupt vector message on the bus including source data identifying the interrupt servicing node.

13. An interrupt servicing node in accordance with claim 7 further including means for detecting an interrupt vector message on the bus including source data identifying the interrupt servicing node.

14. An interrupt servicing node in accordance with claim 8 further including means for detecting an interrupt vector message on the bus including source data identifying the interrupt servicing node.

15. An interrupt servicing node for servicing an interrupt request message from an interrupting node including ID data identifying the interrupting node, the interrupt servicing node adapted to be coupled to a pended bus for transferring messages between the interrupt servicing node and the interrupting node, the interrupt servicing node comprising:

means for detecting the interrupt request message on the bus, in which the interrupt request detecting means includes means for detecting whether the interrupt request message includes destination data specifying the interrupt servicing node;

means for providing to the bus an interrupt acknowledge message including destination data specifying the interrupting node at times when the interrupt servicing node is ready to service the interrupt request message from the interrupting node; and storage means, coupled to the detecting means and the providing means, including a plurality of node storage elements each corresponding to an interrupting node, for indicating whether an interrupt request is pending from the interrupting node, the storage means including:

means, coupled to the detecting means, for setting the node storage element corresponding to the interrupting node in response to the detecting of the interrupt request message including the ID data identifying the interrupting node; and means, coupled to the providing means, for clearing the node storage element corresponding to the interrupting node in response to the providing of an interrupt acknowledge message including destination data specifying the interrupting node.

16. An interrupt servicing node in accordance with claim 4 in which the interrupt request detecting means includes means for detecting whether the interrupt request message includes destination data specifying the interrupt servicing node.

17. An interrupt servicing node in accordance with claim 11 in which the interrupt request detecting means includes means for detecting whether the interrupt request message includes destination data specifying the interrupt servicing node.

18. An interrupt servicing node in accordance with claim 13 in which the interrupt request detecting means includes means for detecting whether the interrupt request meassage includes destination data specifying the interrupt servicing node.

19. An interrupt servicing node for servicing an interrupt request message from an interrupting node including ID data identifying the interrupting node, the interrupt servicing node adapted to be coupled to a pended bus for transferring messages between the interrupt servicing node and the interrupting node, the interrupt servicing node comprising:
means for detecting the interrupt request message on the bus;
means for providing to the bus an interrupt acknowledge message including destination data specifying the interrupting node at times when the interrupt servicing node is ready to service the interrupt request message from the interrupting node; and
storage means, coupled to the detecting means and the providing means, including a plurality of node storage elements each corresponding to an interrupting node, in which each of the plurality of node storage elements corresponds to one of a plurality of interrupt nodes, for indicating whether an interrupt request is pending from the interrupting node, the storage means including:
means, coupled to the detecting means, for setting the node storage element corresponding to the interrupting node in response to the detecting of the interrupt request message including the ID data identifying the interrupting node; and
means, coupled to the providing means, for clearing the node storage element corresponding to the interrupting node in response to the providing of an interrupt acknowledge message including destination data specifying the interrupting node.

20. An interrupt servicing node in accordance with claim 4 in which each of the plurality of node storage elements corresponds to one of a plurality of interrupting nodes at one of a plurality of priority levels.

21. An interrupt servicing node for servicing an interrupt request message from an interrupting node including ID data identifying the interrupting node and priority level data specifying a priority level of the interrupt request message, the interrupt servicing node adapted to be coupled to a pended bus for transferring messages between the interrupt servicing node and the interrupting node, the interrupt servicing node comprising:
means for detecting the interrupt request message on the bus;
means for providing to the bus an interrupt acknowledge message including destination data specifying the interrupting node, source data identifying the interrupt servicing node as the source of the interrupt acknowledge message, and priority level data specifying the priority level, at times when the interrupt servicing node is ready to service the interrupt request message from the interrupting node;
storage means, coupled to the detecting means and the providing means, including a plurality of node storage elements each corresponding to an interrupting node at a specified priority level, for indicating whether an interrupt request is pending from the interrupting node at the specified priority level, the storage means including:
means, coupled to the detecting means, for setting the node storage element corresponding to the interrupting node at the specified priority level in response to the detecting of the interrupt request message including the ID and priority level data which identifies the interrupting node and specifies the priority level of the interrupt request message;
means, coupled to the providing means, for clearing the node storage element corresponding to the interrupting node at the specified priority level in response to the providing of an interrupt acknowledge message including destination data specifying the interrupting node and priority level data specifying the priority level of the interrupt request message; and
service priority level means, coupled to the providing means, for specifying a service priority level for the interrupt servicing node and for indicating that the interrupt servicing node is ready to service the interrupt request message at times when the priority level of the interrupt request message is greater than the service priority level; and
means for detecting an interrupt vector message on the bus including source data identifying the interrupt servicing node.

22. A method for an interrupt servicing node adapted to be coupled to a pended bus to service an interrupt request message including ID data identifying an interrupting node, the interrupt servicing node including a plurality of node storage elements each corresponding to an interrupting node, wherein the method performed by the interrupt servicing node comprises the steps of:
detecting the interrupt request message on the bus;
setting a node storage element corresponding to the interrupting node to indicate that an interrupt request is pending from interrupting node, in response to the detecting of the interrupt request message including the ID data identifying the interrupting node;
providing to the bus an interrupt acknowledge message including destination data specifying the interrupting node and source data identifying the interrupt servicing node as the source of the interrupt acknowledge message at times when the interrupt servicing node is ready to service a pending interrupt request message; and
detecting an interrupt vector message on the bus including source data identifying the interrupt servicing node.

23. A method for an interrupt servicing node adapted to be coupled to a pended bus to service an interrupt request message including ID data identifying an interrupting node, the interrupt servicing node including a plurality of node storage elements each corresponding to an interrupting node, wherein the method performed by the interrupt servicing node comprises the steps of:
detecting the interrupt request message on the bus;
setting a node storage element corresponding to the interrupting node to indicate that an interrupt request is pending from the interrupting node, in response to the detecting of the interrupt request message including the ID data identifying the interrupting node;
providing to the bus an interrupt acknowledge message including destination data specifying the interrupting node at times when the interrupt servicing node is ready to service a pending interrupt request message;

detecting an interrupt acknowledge message including destination data specifying the interrupting node; and clearing the node storage element corresponding to the interrupting node in response to the detecting of an interrupt acknowledge message including destination data specifying the interrupting node.

24. A method for an interrupt servicing node adapted to be coupled to a pended bus to service an interrupt request message including ID data identifying an interrupting node, the interrupt servicing node including a plurality of node storage elements each corresponding to an interrupting node, wherein the method performed by the interrupt servicing node comprises the steps of:

detecting the interrupt request message on the bus;

setting a node storage element corresponding to the interrupting node to indicate that an interrupt request is pending from the interrupting node, in response to the detecting of the interrupt request message including the ID data identifying the interrupting node;

obtaining control of the bus at times when the interrupt servicing node is ready to service a pending interrupt request message and performing null operations for a predetermined time period;

providing to the bus an interrupt acknowledge message including destination data specifying the interrupting node after the predetermined time period at times when the node storage element corresponding to the interrupting node is set;

detecting an interrupt acknowledge message including destination data specifying the interrupting node; and clearing the node storage element corresponding to the interrupting node in response to the detecting of an interrupt acknowledge message including destination data specifying the interrupting node.

25. A method for an interrupt servicing node adapted to be coupled to a pended bus to service an interrupt request message including ID data identifying an interrupting node, the interrupt servicing node including a plurality of node storage elements each corresponding to an interrupting node, wherein the method performed by the interrupt servicing node comprises the steps of:

detecting the interrupt request message on the bus;

setting a node storage element corresponding to the interrupting node to indicate that an interrupt request is pending from the interrupting node, in response to the detecting of the interrupt request message including the ID data identifying the interrupting node;

providing to the bus an interrupt acknowledge message including destination data specifying the interrupting node and source data identifying the interrupt servicing node as the source of the interrupt acknowledge message at times when the interrupt servicing node is ready to service a pending interrupt request message;

detecting an interrupt vector message on the bus including source data identifying the interrupt servicing node;

detecting an interrupt acknowledge message including destination data specifying the interrupting node; and clearing the node storage element corresponding to the interrupting node in response to the detecting of an interrupt acknowledge message including destination data specifying the interrupting node.

26. A method for an interrupt servicing node adapted to be coupled to a pended bus to service an interrupt request message including ID data identifying an interrupting node and priority level data specifying a priority level of the interrupt request message, the interrupt servicing node including a plurality of node storage elements each corresponding to an interrupting node at a specified priority level, wherein the method performed by the interrupt servicing node comprises the steps of:

detecting the interrupt request message on the bus;

setting a node storage element corresponding to the interrupting node at the specified priority level to indicate that an interrupt request is pending from the interrupting node, in response to the detecting of the interrupt request message including the ID data identifying the interrupting node and the priority level data specifying the priority level of the interrupt request message;

specifying a service priority level for the interrupt servicing node to indicate that the interrupt servicing node is ready to service the interrupt request message at times when the priority level of the interrupt request message is greater than the service priority level; and providing to the bus an interrupt acknowledge message including destination data specifying the interrupting node and priority level data specifying the priority level at times when the interrupt servicing node is ready to service a pending interrupt request message.

27. A method for an interrupt servicing node adapted to be coupled to a pended bus to service an interrupt request message including ID data identifying an interrupting node and priority level data specifying a priority level of the interrupt request message, the interrupt servicing node including a plurality of node storage elements each corresponding to an interrupting node at a specified priority level, wherein the method performed by the interrupt servicing node comprises the steps of:

detecting the interrupt request message on the bus;

setting a node storage element corresponding to the interrupting node at the specified priority level to indicate that an interrupt request is pending from the interrupting node, in response to the detecting of the interrupt request message including the ID data identifying the interrupting node and the priority level data specifying the priority level of the interrupt request message;

specifying a service priority level for the interrupt servicing node to indicate that the interrupt servicing node is ready to service the interrupt request message at times when the priority level of the interrupt request message is greater than the service priority level;

providing to the bus an interrupt acknowledge message including destination data specifying the interrupting node, source data identifying the interrupt servicing node as the source of the interrupt acknowledge message, and priority level data specifying the priority level, at times when the interrupt servicing node is ready to service a pending interrupt request message; and detecting an interrupt vector message on the bus including source data identifying the interrupt servicing node.

28. A method for an interrupt servicing node adapted to be coupled to a pended bus to service an interrupt request message including ID data identifying an interrupting node and priority level data specifying a priority level of the interrupt request message, the interrupt servicing node including a plurality of node storage elements each corresponding to an interrupting node at a specified priority level, wherein the method performed by the interrupt servicing node comprises the steps of:

detecting the interrupt request message on the bus;
setting a node storage element corresponding to the interrupting node at the specified priority level to indicate that an interrupt request is pending from the interrupting node, in response to the detecting of the interrupt request message including the ID data identifying the interrupting node and the priority level data specifying the priority level of the interrupt request message;
specifying a service priority level for the interrupt servicing node to indicate that the interrupt servicing node is ready to service the interrupt request message at times when the priority level of the interrupt request message is greater than the service priority level;
providing to the bus an interrupt acknowledge message including destination data specifying the interrupting node and priority level data specifying the priority level at times when the interrupt servicing node is ready to service a pending interrupt request message;
detecting an interrupt acknowledge message including destination data specifying the interrupting node and priority level data specifying the priority level of the interrupt request message; and
clearing the node storage element corresponding to the interrupting node at the specified priority level in response to the detecting of an interrupt acknowledge message including destination data specifying the interrupting node and priority level data specifying the priority level of the interrupt request message.

29. A method for an interrupt servicing node adapted to be coupled to a pended bus to service an interrupt request message including ID data identifying an interrupting node and priority level data specifying a priority level of the interrupt request message, the interrupt servicing node including a plurality of node storage elements each corresponding to an interrupting node at a specified priority level, wherein the method performed by the interrupt servicing node comprises the steps of:

detecting the interrupt request message on the bus;
setting a node storage element corresponding to the interrupting node at the specified priority level to indicate that an interrupt request is pending from the interrupting node, in response to the detecting of the interrupt request message including the ID data identifying the interrupting node and the priority level data specifying the priority level of the interrupt request message;
specifying a service priority level for the interrupt servicing node to indicate that the interrupt servicing node is ready to service to interrupt request message at times when the priority level of the interrupt request message is greater than the service priority level;
obtaining control of the bus at times when the interrupt servicing node is ready to service a pending interrupt request message and performing null operations for a predetermined time period;
providing to the bus an interrupt acknowledge message including destination data specifying the interrupting node and priority level data specifying the priority level after the predetermined time period at times when the node storage element corresponding to the interrupting node is set;
detecting an interrupt acknowledge message including destination data specifying the interrupting node and priority level data specifying the priority level of the interrupt request message; and
clearing the node storage element corresponding to the interrupting node at the specified priority level in response to the detecting of an interrupt acknowledge message including destination data specifying the interrupting node and priority level data specifying the priority level of the interrupt request message.

30. A method for an interrupt servicing node adapted to be coupled to a pended bus to service an interrupt request message including ID data identifying an interrupting node and priority level data specifying a priority level of the interrupt request message, the interrupt servicing node including a plurality of node storage elements each corresponding to an interrupting node at a specified priority level, wherein the method performed by the interrupt servicing node comprises the steps of:

detecting the interrupt request message on the bus;
setting a node storage element corresponding to the interrupting node at the specified priority level to indicate that an interrupt request is pending from the interrupting node, in response to the detecting of the interrupt request message including the ID data identifying the interrupting node and the priority level data specifying the priority level of the interrupt request message;
specifying a service priority level for the interrupt servicing node to indicate that the interrupt servicing node is ready to service the interrupt request message at times when the priority level of the interrupt request message is greater than the service priority level;
providing to the bus an interrupt acknowledge message including destination data specifying the interrupting node, source data identifying the interrupt servicing node as the source of the interrupt acknowledge message, and priority level data specifying the priority level, at times when the interrupt servicing node is ready to service a pending interrupt request message;
detecting an interrupt vector message on the bus including source data identifying the interrupt servicing node;
detecting an interrupt acknowledge message including destination data specifying the interrupting node and priority level data specifying the priority level of the interrupt request message; and
clearing the node storage element corresponding to the interrupting node at the specified priority level in response to the detecting of an interrupt acknowledge message including destination data specifying the interrupting node and priority level data specifying the priority level of the interrupt request message.

* * * * *